(12) United States Patent
Miller

(10) Patent No.: US 7,100,085 B2
(45) Date of Patent: *Aug. 29, 2006

(54) SYSTEM FOR AUTOMATED PROBLEM DETECTION, DIAGNOSIS, AND RESOLUTION IN A SOFTWARE DRIVEN SYSTEM

(75) Inventor: Allan A. Miller, Hollis, NH (US)

(73) Assignee: HandsFree Networks, Inc., Nashua, NH (US)

( * ) Notice: Subject to any disclaimer, the term of this patent is extended or adjusted under 35 U.S.C. 154(b) by 144 days.

This patent is subject to a terminal disclaimer.

(21) Appl. No.: 10/851,690

(22) Filed: May 21, 2004

(65) Prior Publication Data

US 2005/0015678 A1    Jan. 20, 2005

Related U.S. Application Data

(63) Continuation of application No. 09/568,390, filed on May 10, 2000, now Pat. No. 6,742,141.

(60) Provisional application No. 60/133,383, filed on May 10, 1999.

(51) Int. Cl.
*G06F 11/00* (2006.01)

(52) U.S. Cl. ............................. 714/26; 714/20

(58) Field of Classification Search ............... 707/7
See application file for complete search history.

(56) References Cited

U.S. PATENT DOCUMENTS

| 5,829,001 | A | * | 10/1998 | Li et al. ..................... 707/10 |
| 5,944,839 | A | * | 8/1999 | Isenberg ...................... 714/26 |
| 6,035,423 | A | * | 3/2000 | Hodges et al. ................ 714/38 |
| 6,247,151 | B1 | * | 6/2001 | Poisner ....................... 714/718 |
| 6,260,048 | B1 | * | 7/2001 | Carpenter et al. ........ 707/104.1 |
| 6,298,457 | B1 | * | 10/2001 | Rachlin et al. ............... 714/49 |
| 6,370,542 | B1 | * | 4/2002 | Kenyon .................. 707/103 R |
| 6,473,659 | B1 | * | 10/2002 | Shah et al. ................... 700/79 |
| 6,487,677 | B1 | * | 11/2002 | Jantz et al. ..................... 714/2 |

* cited by examiner

*Primary Examiner*—Robert Beausoliel
*Assistant Examiner*—Marc Duncan
(74) *Attorney, Agent, or Firm*—Hamilton, Brook, Smith & Reynolds, P.C.

(57) ABSTRACT

In many systems, computer software is a common source of failure or instability. The proliferation of multiple interacting applications from several different software vendors leads to "emergent" problems that are difficult or impossible to predict or prevent. The problems are compounded by the use of networks, which introduce the added complexity of applications on multiple machines interacting in complex scenarios. As a result, many business and home users are hindered from using software-based systems to their fullest potential. More effective use of these systems can be aided by an application which can provide services for monitoring, diagnosing, and solving problems that occur in the operation of the machines at a customer facility. In the system described herein, a database contains entries with executable code that can make use of these services in order to monitor, diagnose, and solve specific problems. Each entry in the database addresses a specific problem. The executable code is designed to isolate and recognize the problem, and then implement a fix or workaround for that problem. The executable code is designed to completely automate the entire process of detection and resolution of the problem. Further, manual intervention may be employed to complete the diagnosis or solution.

17 Claims, 28 Drawing Sheets

FIG. 6

- 100
- 109 — 1. Entry number
- 110 — 2. Initialization executable code
- 101 — 3. Immediate response executable code
- 102 — 4. Symptom executable code
- 103 — 5. Solution executable code
- 104 — 6. Short (summary) descriptive text
- 105 — 7. Long (detailed) descriptive text
- 106 — 8. Severity level of problem
- 107 — 9. Danger level of implementing solution
- 108 — 10. Entry source
- 11. Total number of times solution has been used

FIG. 8A

Initialization 190
191 — entry_num = begin_register_entry();
192 — add_condition(EXECUTABLE,MS_EXCHANGE);
— add_condition(ERROR_DIALOG, "The message recipient's mailbag does not exist or is busy. Contact your
193 administrator.");
— end_register_entry();

Immediate response 194
195 — dialog_box = condition_dialog();
— error_executable = dialog_owner(dialog_box);

FIG. 8B

Symptom

- 140
- 141 — if (error_executable != MS_EXCHANGE) return(FALSE);
- 142 — if (mail_app() != MS_EXCHANGE) return(FALSE);
- 143 — post_office = mse_post_office();
- 144 — machine = machine_location(post_office);
- 145 — if (remote(machine,os_type()) != NOVELL) || (remote(machine,os_ver()) != 311)) return(FALSE);
- 146 — error_code = open_file(post_office);
- 147 — if (error_code != FILE_ALREADY_OPEN) return(FALSE);
- 148 — close_file(post_office);
- return(TRUE);

Solution

- 149 — reg_key = registry_key("HKEY_LOCAL_MACHINE\System\CurrentControlSet\Services\VxD\NWREDIR");
- 150 — if (reg_key == NULL) {
- 151 — error(NO_REG_KEY);
- 152 — return(FALSE);
- 153 — }
- 154 — add_binary_value(regkey,"supportlfn",0);
- 155 — confirm_restart();
- return(TRUE);

FIG. 11
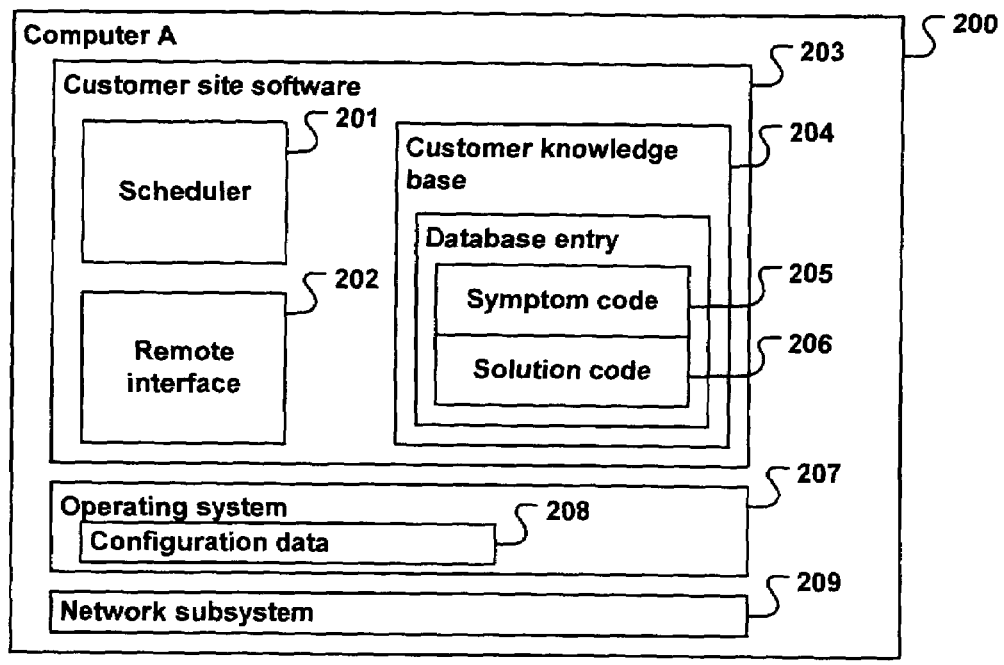
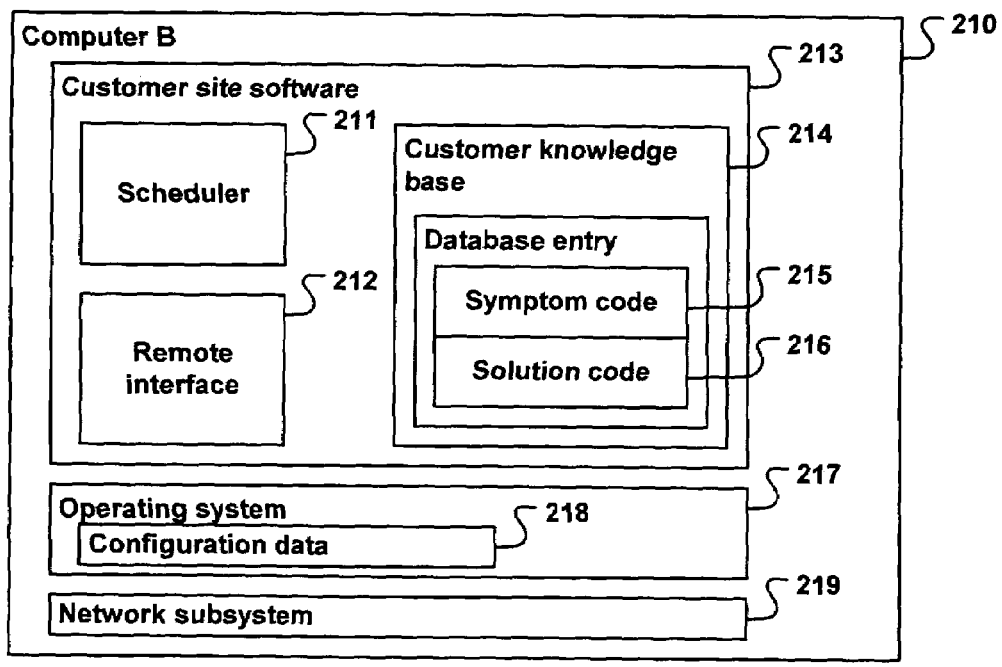

FIG. 14

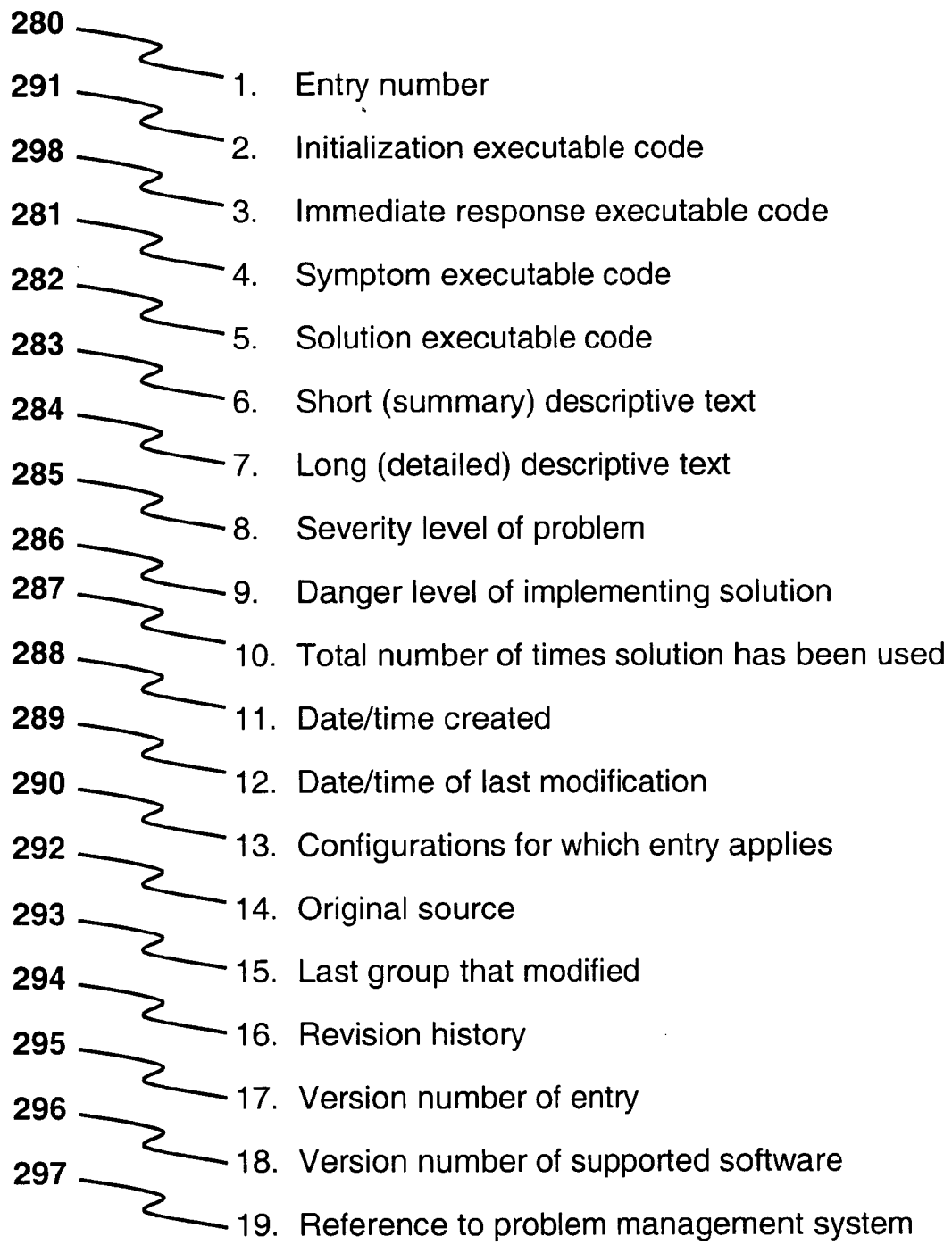

280

291 — 1. Entry number
298 — 2. Initialization executable code
281 — 3. Immediate response executable code
282 — 4. Symptom executable code
283 — 5. Solution executable code
284 — 6. Short (summary) descriptive text
285 — 7. Long (detailed) descriptive text
286 — 8. Severity level of problem
287 — 9. Danger level of implementing solution
288 — 10. Total number of times solution has been used
289 — 11. Date/time created
290 — 12. Date/time of last modification
292 — 13. Configurations for which entry applies
293 — 14. Original source
294 — 15. Last group that modified
295 — 16. Revision history
296 — 17. Version number of entry
297 — 18. Version number of supported software
— 19. Reference to problem management system

FIG. 15

300
301 — 1. Hardware Manufacturer Text Knowledge Bases
302 — 2. Software Manufacturer Text Knowledge Bases
303 — 3. Knowledge Base Reseller
304 — 4. Internal Call Center Problem Management System
305 — 5. Network Support Publications
306 — 6. Internal Staff of Technicians
— 7. Public Publications and Message Boards

SYSTEM FOR AUTOMATED PROBLEM DETECTION, DIAGNOSIS, AND RESOLUTION IN A SOFTWARE DRIVEN SYSTEM

RELATED APPLICATIONS

This application is a continuation of U.S. application Ser. No. 09/568,390, filed May 10, 2000 now U.S. Pat. No. 6,742,141, which claims the benefit under 35 U.S.C. § 119(e) to U.S. provisional patent application No. 60/133,383, filed May 10, 1999, entitled System for Automated Detection and Resolution of Problems in Computer Networks, the entire teachings of which are incorporated herein by reference.

BACKGROUND OF THE INVENTION

Computers, computer networks, and other software-based systems are becoming increasingly important as part of the infrastructure of everyday life. Businesses rely more and more on the use of electronic mail as a means of communication, and on Internet browsers as a means of doing research as well as marketing. Even home users are starting to depend on computers and other "intelligent appliances" for everyday household tasks. Networks are used for sharing peripherals and files, as well as for providing Internet access to the entire household. Computer software represents the single most complex component in most systems, and is the most common source of failure or instability. The proliferation of multiple interacting applications from several different software vendors leads to "emergent" problems that are difficult or impossible to predict or prevent. The problems are compounded by the use of networks, which introduce the added complexity of applications on multiple machines interacting in obscure and unforeseen ways. As a result, most business and home users find that the cost of keeping these software-based systems running prevents them from making use of all but the simplest features.

There are many commercial products to help diagnose and repair problems with large computer networks. These products provide facilities for recording traffic, analyzing events, and examining configuration settings. They are usually fairly expensive, and are designed for experienced users who understand the details of computer network configuration and operations. In addition, they usually provide very little help in managing the complexity of software configuration.

There are also inexpensive commercial products designed to help diagnose and correct common problems with computer systems and software configuration issues. Typically, these products do a very good job of addressing a relatively small set of issues that occur for many users. Most of the time, these products do not address issues that affect the interaction of multiple applications. In addition, they usually do not address the operation of computer networks.

Commercial anti-virus packages do a very good job of detecting and repairing a very specific type of problem, and are designed in such a way that new viruses can easily be added to the list of problems that the software can handle. These products do not attempt to handle any kind of problem outside the fairly narrow scope of computer viruses.

Another category of commercial software includes programs that save state information about a computer system and then have the capability to revert to a prior saved state. Such software is good for recovering from problems that are introduced by installations or inadvertent modifications, but they recover by disabling the operation that caused the problem. Also, they do not even attempt to prevent common problems with specific known workarounds.

Most complex electronic devices, including computer systems and network hardware, are designed with built-in diagnostics. These diagnostics are specifically designed for the system and usually detect a fairly wide range of problems. Sometimes they can also implement fixes or workarounds, or at least pinpoint a problem to speed its repair. However, they usually cannot handle problems that arise from interactions with other equipment, and they typically cannot be updated to handle new problems that start to happen after the hardware has been released.

The family of software called "expert systems" has proven its usefulness in situations where problems can only be solved by fairly complex reasoning involving specialized knowledge about a specific field. Diagnosing and repairing computer-related problems is one of the situations that works well for expert systems, and they have been applied to the area with relatively good results. However, the specialized knowledge (and resulting rules for the system) have focused on general troubleshooting and repair, and usually serve as a tool to allow technicians to efficiently access information in order to speed up the repair process. While this approach certainly reduces costs and time, it does little to truly automate the diagnosis and repair process.

Other expert systems have been applied directly to automated problem diagnosis and resolution. These systems have worked well in their scope of use, but have had limits due to the known problem of expert system rule sets becoming "brittle" as they get large, and the requirement of the inference engine to resolve more and more complex interactions between rules in the larger set. The present invention avoids these issues with a database containing entries of very specific symptoms and solutions that rarely ever overlap or otherwise interact. This eliminates the need for an inference engine to resolve or sequence any such interactions.

The family of software called "case-based reasoning systems" has also been used to advantage in automating customer support tasks. While these systems have been successful in their scope of use, they have typically been used in a role of improving the efficiency of a human technician who is providing support. Their main feature is the ability to generalize existing successes in resolving previous problems and apply the principles to a new problem at hand. They then learn based on the success or failure of this effort, adding this information to their knowledge base. The present invention does not utilize this learning process, and can therefore act in a fully automated way using the much more objective information in its knowledge base, which is represented as executable code.

Support centers are now making good use of technology to allow first-level support staff to handle many of the calls without needing assistance from more senior (and expensive) staff. This staff can search databases using keywords and other criteria to try to find descriptions that match the customer problem, and then help the customer with the solution provided in the database. Since most problems happen to many people, this sharing of information greatly reduces the cost required to handle a single customer. However, the lower limit of this cost is still determined by the minimum time for a person to finish the call, and the minimum wage of the staff with the skills needed to use the technology.

While each of the approaches described provides one or more ways to help make support more accessible, none of them provides a fully automated diagnosis and repair process applicable to a software based system. It would be beneficial to provide a system and method to provide an automated diagnosis, analysis, and implementation process that can effect effortless, reliable, and affordable support for software-based systems.

SUMMARY OF THE INVENTION

A system and method to provide general services for monitoring, diagnosing, and solving problems that occur in the operation of the machines at the customer's facility serves to automate the support process of a software-based system. The system as defined herein includes software that is typically installed on a plurality of machines at the customer's facility. A database contains entries with executable code that can make use of these general services in order to monitor, diagnose, and solve specific problems. Each entry in the database addresses a specific problem. The executable code is designed to isolate and recognize the problem, and then implement a fix or workaround for that problem. The executable code is designed to completely automate the entire process of detection and resolution of the problem. Further, manual intervention may be employed to complete the diagnosis or solution. The executable code in the database uses the general services of the customer site software to request assistance from the customer.

The database also contains executable code that can be used to extend the general services of the customer site software. This code is stored as procedures that can be called from any executable code in the database, using the same interface as calls to the general services of the customer site software.

The executable code in the database can be loaded and executed on an "as-needed" basis, so that it is not necessary to have the entire database in memory at one time. Database entries can also be cached so that commonly accessed entries are always available for quick use. The programming language used for creating database entries is flexible. A simple interface for loading and executing a database entry is defined, so that any language can be used for creating database entries by implementing the interface for that language.

The executable part of each database entry has four parts:
Initialization: registers the database entry with the customer site software. This code is executed once in order to set up the triggers corresponding to system-level events that will be used to activate the database entry.
Immediate response: does any processing that requires low latency, for example, recording state information about a resource that does not exist for a long period of time after the conditions arise that activate the database entry. This code is cached locally in a relatively high-speed memory to make it quickly accessible.
Symptom: determines whether the database entry actually applies. This code can do a more detailed check of the state of the hardware and software than is specified by the conditions of the initialization.
Solution: resolves the issue. This code modifies the state of the system in order to implement the solution.

In addition, each database entry contains information used for administration functions.

It is important for the customer site software to cause little impact on system performance. The software must efficiently decide which database entries to apply, and in what order to apply them. The database organization facilitates this operation. When the initialization part of a database entry executes, it specifies the conditions that must be met in order for the database entry to apply. These conditions are used to configure a table-driven mechanism that responds to system-level events that change the conditions. When an event changes the conditions to a set that matches those identified by the initialization of a database entry, the immediate response code for that entry is executed. Then the symptom code for that entry is retrieved, loaded, and executed. If the symptom code indicates that the database entry applies, then the solution code for the entry is retrieved, loaded, and executed. In this way, the customer site software only runs when it is likely that it will be needed, rather than using a resource-intensive polling mechanism.

Some problems can only be detected and resolved with the cooperation of more than one machine. Because of this, the customer site software must be able to coordinate tests that involve multiple machines. This is done by providing a facility for the executable code in a database entry to run equally easily on any machine in the network. This allows the code to determine relevant state information across the entire network, and also to implement solutions that involve changes on multiple systems. The network capability also allows problem conditions on one machine to be very easily diagnosed, reported, and resolved on another machine. This can be very important, since some machines may not have the facilities to complete the task. For example, a machine such as a server may not have a visual display to report problems. Similarly, a machine that does not have direct access to a connected printer may not be able to resolve a configuration issue with that printer.

Typically, software that involves cooperation of multiple machines in this way is difficult to create and has many different potential problems (such as race conditions) that are difficult to find and fix. The present invention uses a simple symmetric model of remote execution that is conceptually very easy to understand, and can be synchronized in a way that prevents nearly all race conditions but remains efficient in execution. This design is important in that it allows adding database entries with relative ease, encouraging the use of the database for the detection and resolution of a wide variety of different problems.

The organization of the database into independent executable entries provides flexibility in programming the customer site software. Most database entries address specific problems with well-defined symptoms and solutions. Other entries diagnose more general problems, but are set up to be conditional upon specific configurations that are likely to cause those problems, such as those created while installing a new piece of software. Still other database entries address problems that are not errors by themselves, but represent situations where it is likely that the customer has inadvertently made a mistake in configuring the system. Other entries diagnose and repair problems based on general symptoms in much the same way a person uses general troubleshooting guidelines to diagnose and repair problems. Other entries detect situations that are not actual problems, but are likely to indicate that a real problem has gone undetected. Finally, other entries handle cases where the customer finds a problem that was not detected, and guide the customer through the process of gathering information for general diagnosis.

The invention also features software that runs at a central facility. This central facility software is set up to provide updates for the database that is kept locally at the customer site (called the customer knowledge base). It is also set up to process problems that cannot be solved automatically, by involving a customer support technician. The central facility software also allows customer support technicians to use the customer facilities remotely to help them diagnose problems and determine solutions for them. The central facility uses a centralized customer database, stored at the central facility, to keep track of pending and closed customer issues, and to record support information about the customer facility. The same database is used for billing functions, allowing timely and accurate billing. Using this database to support marketing functions as well allows accurate targeted marketing opportunities and helps to meet the customer needs with minimal manual effort.

Updates to the customer knowledge base are done by extracting a subset of database entries from a master knowledge base. The update uses the configuration of the customer facility to extract the relevant entries from the master knowledge base and create a new customer knowledge base. The new customer knowledge base is then compared to the existing customer knowledge base, and the difference is transferred to the customer site. The customer site software uses this difference information to update the customer knowledge base.

When the customer site software detects a problem that cannot be resolved, it initiates an automated problem escalation. The first step in this process is to initiate an update of the customer knowledge base as previously described, and then attempt to resolve the problem using the updated knowledge base. If the solution to the problem has been recently added to the master knowledge base, then this update will resolve the problem successfully. If, however, the problem remains unresolved after the update, then the customer site software continues the escalation process. It collects all relevant information about the configuration of the customer facility, as well as the information gathered while detecting the problem, electronically contacts a call center, and transfers this information to the call center. Technicians at the call center use this information to attempt to reproduce the problem on their test network, and discover a solution for it. If they are successful, they add a new entry to the master knowledge base that can diagnose and resolve the problem. The customer site software periodically checks the status of the problem escalation, and when it discovers that a resolution is available, it initiates an update of the customer knowledge base as previously described. This transfers the new database entry to the customer knowledge base, where it is used to solve the problem.

If technicians at the call center are unable to reproduce the problem based on the information from the customer site software, they may need to access the customer network to find a solution. To enable this access, the customer initiates a remote support session. The customer site software contacts the central facility software using a secure, encrypted protocol. The technicians can then execute code on the customer systems, using the same facility previously described for executing code on other machines. This facility gives the technicians access to, and control of, any information they need for successful diagnosis and resolution of the problem. Once they have been able to code and test a database entry to diagnose and resolve the problem, they add it to the master knowledge base and the customer knowledge base is updated as previously described.

The distribution of the knowledge base is tiered, much like the memory architecture of a modem computer system. The master copy is stored at the central facility, where it can be accessed by any system, but at relatively low speed. Relevant subsets are stored locally at the customer sites, to increase speed of access, and also to allow diagnosis and repair of problems if network connectivity to the central facility is compromised. Only one copy of the customer knowledge base is required at a customer site, but it can be duplicated to increase accessibility and reliability. Similarly, a smaller subset of the customer knowledge base is kept on every machine. This subset contains entries relevant to diagnosing and resolving problems with local network connectivity. That way, if a machine becomes disconnected from the network due to a problem that can be resolved automatically, the problem can still be solved.

The invention features a problem escalation sequence that is modeled after the process used by current call support centers. The customer site software attempts to solve the problem using the customer knowledge base, in the same way that the first-level support staff of a call center attempts to solve the customer problem using a text-based knowledge base. If this attempt is unsuccessful, the customer site software checks to see if there are any updates to the knowledge base and tries again, in the same way that the first-level support staff of a call center checks to see if there are any updates to their text-based knowledge base. If the problem is still not solved, the customer site software collects relevant state information and forwards it to technicians at an electronic call center, in the same way that the first-level support staff of a call center collects as much information about the problem as possible and passes it on to more senior personnel. Finally, if the technicians at the electronic call center cannot resolve the problem, they work with the customer to use a remote support session, in the same way that the final stage of escalation of a call center is a visit to the customer site.

The invention features a mechanism for keeping a record of changes in important state information of the customer systems. This mechanism serves two important functions: to drive the efficient diagnosis of problems, and to keep the customer site up and running during automated problem escalation. By comparing the current state information to previously recorded information, the customer site software can determine what important state information has recently changed. During problem diagnosis, it can then first examine knowledge base entries in which this recently changed state information is relevant. Since recent changes are usually the cause of problems, these entries are much more likely to resolve problems that have just appeared. This method therefore greatly reduces the time and resources used to diagnose problems. If a problem must be escalated to the call center, then the customer site software first checks a number of tests of basic functionality. If any major function of the customer systems is not working correctly, the customer site software goes through a step-by-step process of reverting the state of the systems to a previously recorded state, until the basic functionality is restored. In this way, the customer is left with an operational system while the call center attempts to resolve the problem.

Because of the fact that automated diagnosis and repair will not solve every customer problem, the call center is an integral part of the escalation chain. Since call centers are relatively expensive to build and maintain, there is a large economic incentive to make use of existing call centers. The invention features a technique for easily interfacing to existing call centers. The customer site software formats information in a way that is compatible with the electronic automatic call distributor (ACD) used by an existing call center. The existing call center handles the call tracking, escalation, diagnosis, and resolution in the normal way with its problem management system (PMS). The electronic call center then uses the PMS for access to information about the call, and proceeds with the automated escalation process as previously described.

In this way, the invention provides effortless, reliable, and affordable support for computers, networks, and other software-based systems. The principles of the invention can be extended in many ways and applied to many different environments, as will become apparent in the following description of the preferred embodiment.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 6 illustrates the database tables used for the customer knowledge base;

FIGS. 8A and 8B show a pseudocode representation of a single database entry in the knowledge base;

FIG. 11 is a block diagram of the network implementation in the customer site software;

FIG. 14 illustrates the database tables used for the master knowledge base;

FIG. 15 illustrates the sources of information for data in the master knowledge base;

DETAILED DESCRIPTION OF THE INVENTION

A description of preferred embodiments of the invention follows.

Figure 1:
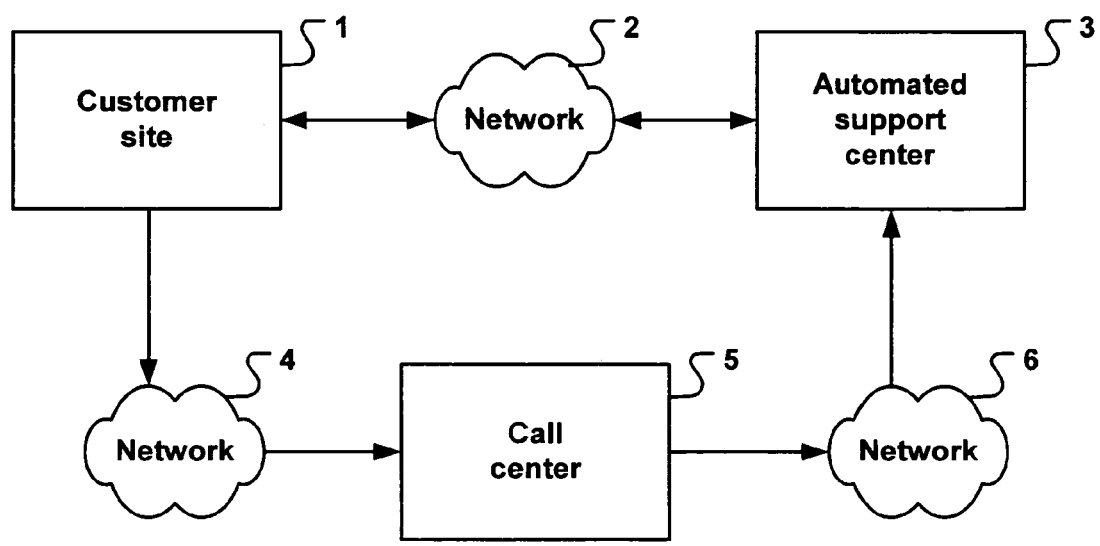
FIG. 1 is a block diagram with an overview of the entire system.

Referring to FIG. 1, a system of providing automated customer support for the computer network at customer site 1 is provided. This automated support is provided using customer site software at customer site 1 and central facility software at automated support center 3. The customer site software and central facility software communicate using network 2. The customer site software periodically initiates an update of the customer site software from the central facility software using network 2. If the automated support is unable to resolve a problem, the customer site software first attempts this update using network 2. If the problem remains unresolved, the customer site software uses network 4 to escalate the problem to call center 5, where the problem is resolved by the support staff. Once the problem is resolved at call center 5, the support staff uses network 6 to integrate the solution into the central facility software at automated support center 3, so that the new solution becomes part of the automated support.

Figure 2:
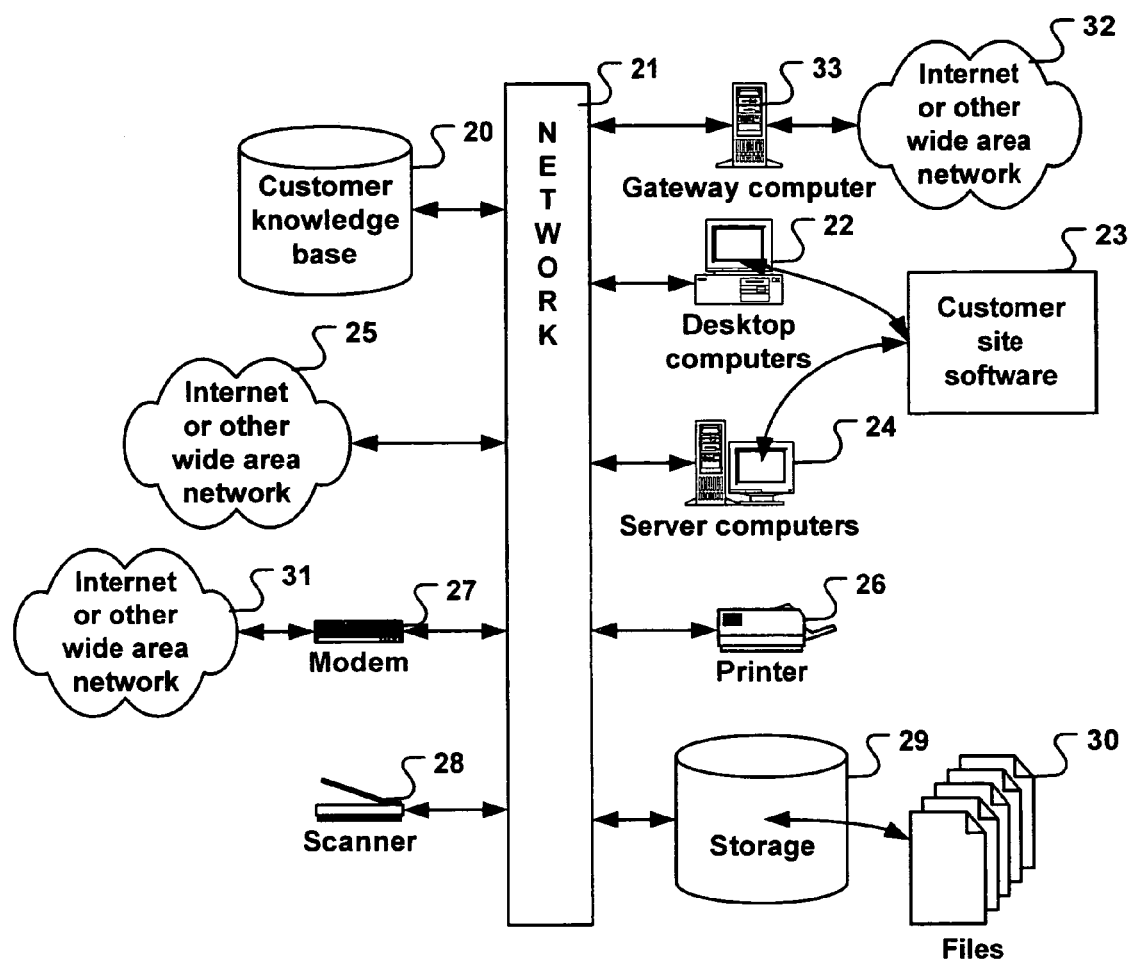
FIG. 2 is a block diagram of the customer site.

Referring to FIG. 2, the customer site consists of a number of desktop computers 22, server computers 24, printers 26, mass storage units 29 containing files 30, modems 27, and scanners 28. These components are connected with a local area network 21, which is in turn configured either for direct access to the Internet or other wide area network 25, or access to the Internet or other wide area network 31 through a modem 27 or access to the Internet or other wide area network 32 through a gateway computer 33. The automated support function uses two components that are stored on mass storage 29: the customer knowledge base 20, and the customer site software 23. The customer site software 23 is executed on the desktop computers 22, the server computers 24, and the gateway computers 31. It should be noted that FIG. 2 is meant to be representative, and many other configurations of computers, storage, peripherals, and network connectivity could be described by one skilled in the art. For example, the customer site could consist of a single desktop computer 22, or could consist solely of standalone devices with embedded software and built-in network connectivity.

Figure 3:
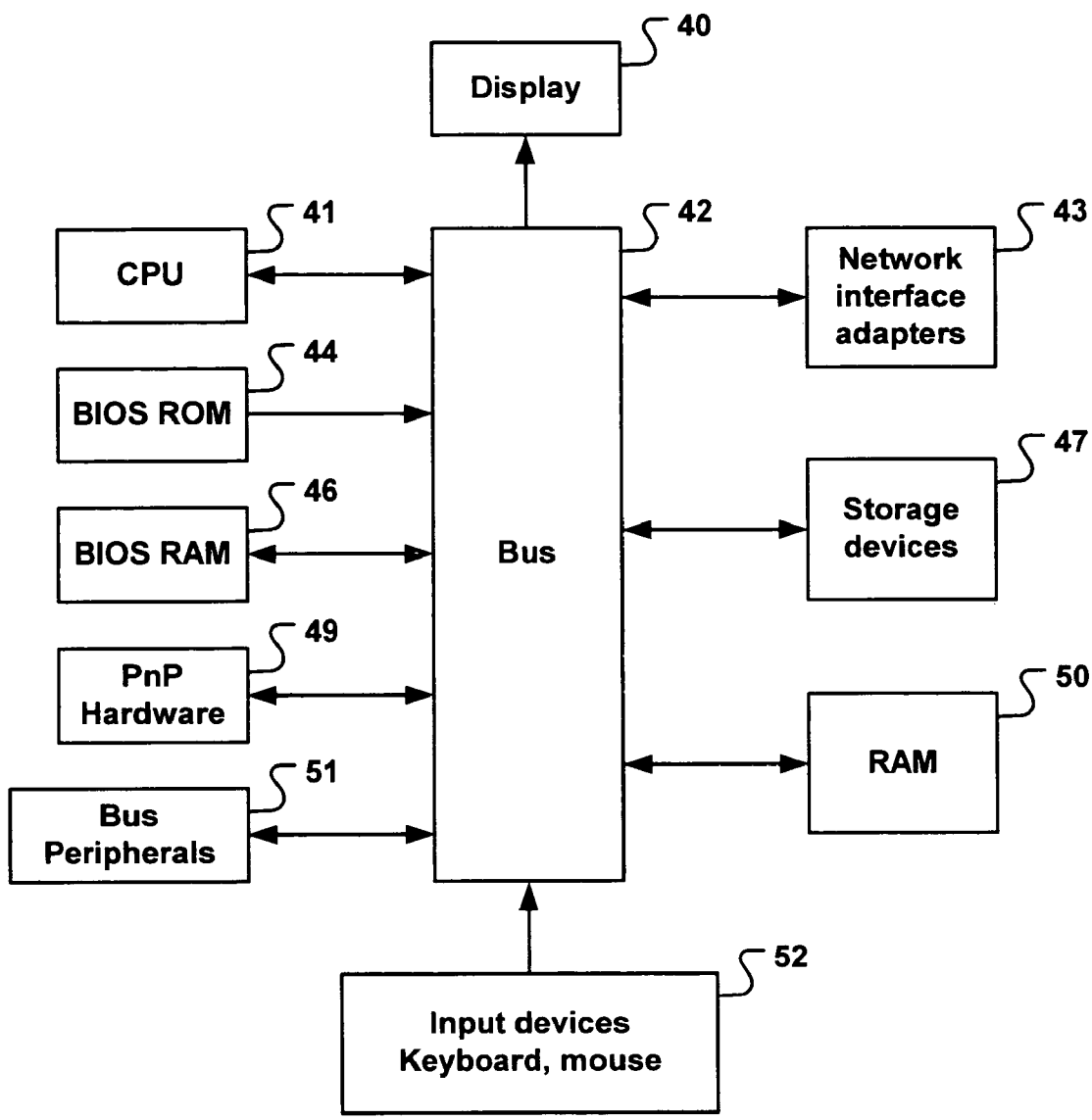
FIG. 3 is a block diagram of the hardware configuration of a single computer at the customer site.

Referring to FIG. 3, a single computer at the customer site contains a number of hardware components. These include the central processing unit (CPU) 41, a random access memory (RAM) 50, two forms of memory used by the basic input/output system (BIOS): random access memory (RAM) 46 and read only memory (ROM) 44, a number of self-configuring (plug and play) peripherals 49, a series of other peripherals 51, a display unit 40, a number of user input devices 52, storage devices 47, and one or more network interface adapters 43. The hardware components are connected by a system bus 42. It should be noted that FIG. 3 is meant to be representative, and many other configurations of memory, peripherals, and storage could be described by one skilled in the art. For example, a single device at the customer site could be a standalone device with embedded software and built-in network connectivity.

Figure 4:
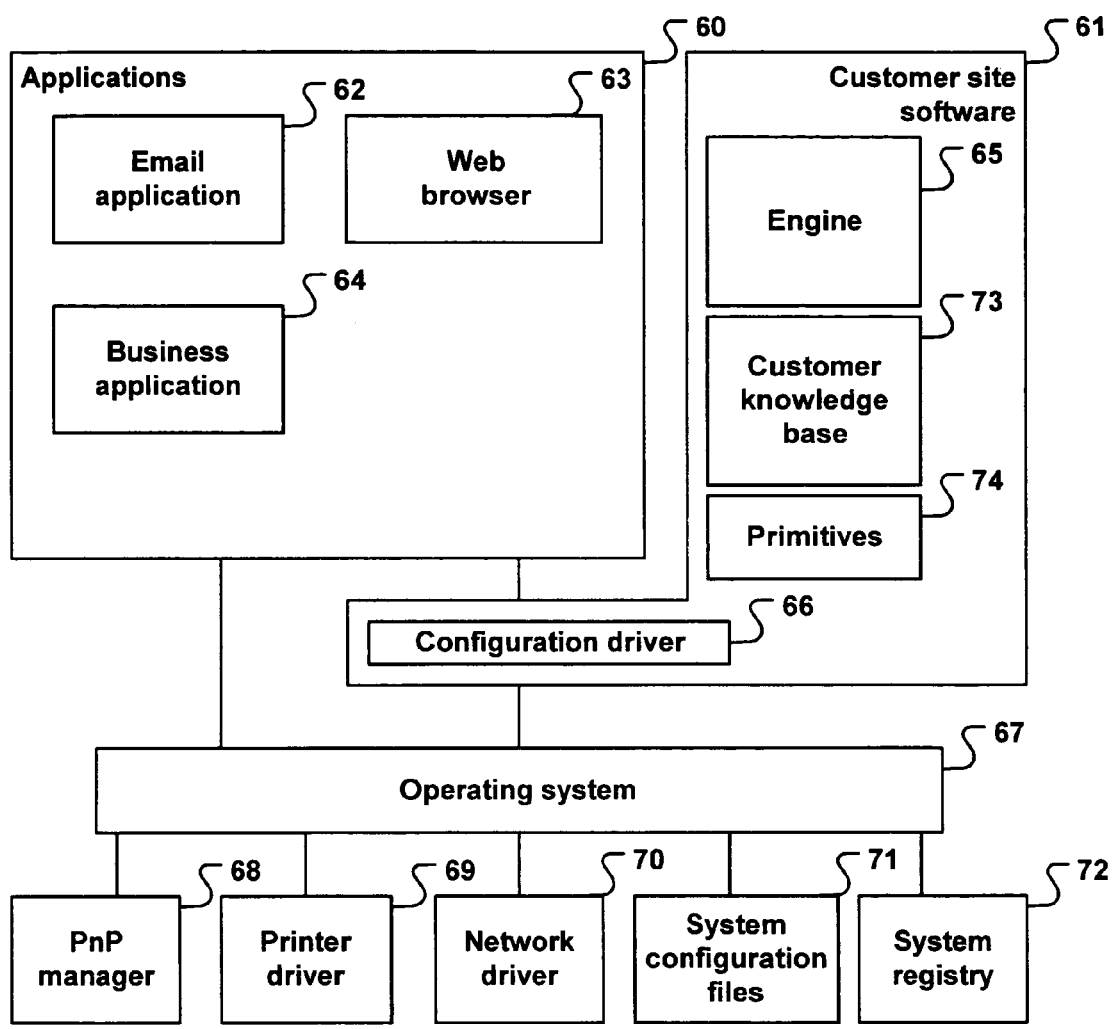
FIG. 4 is a block diagram of the software configuration of a single computer at the customer site.
Figure 5:
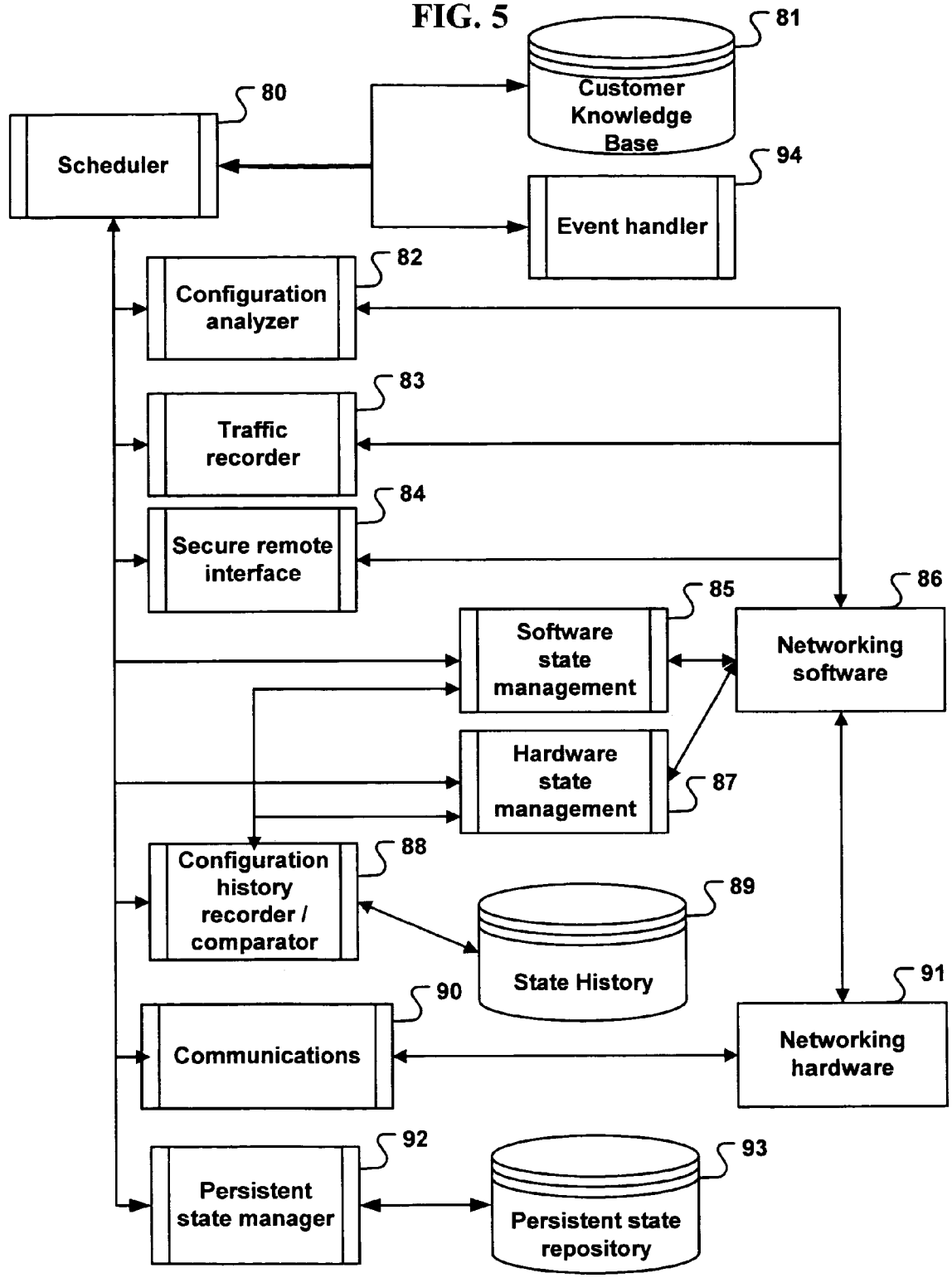
FIG. 5 is a block diagram of the architecture of the customer site software.

Referring to FIGS. 4, 5, and 6, a single computer at the customer site contains a number of software components as well. The operating system 67 manages the software on the system. It uses system configuration files 71 and the registry 72 to store state information controlling the operation of the system. It uses the plug and play (PnP) manager 68 to manage the configuration of the plug and play peripherals 49, the printer driver 69 to manage the printers 26, and the network driver 70 to manage the network interface adapters 43. Most of this activity is transparent to the user of the computer, who is more concerned with using applications 60 that include, but are not limited to, an electronic mail application 62, a web browsing application 63, and other business applications 64. The automated support function uses three components that are part of the customer site software 61: a customer knowledge base 73, which stores the logic that drives the diagnosis and resolution of each particular problem, an engine 65, which drives the actual diagnosis and resolution of problems by managing the execution of code from the customer knowledge base 73and the primitives 74, which implement all the functionality that is accessed through a high-level interface by the entries in the customer knowledge base 73. Both the primitives 74 and applications 60 access the operating system 67 through the programming interface described by the configuration driver 66. It should be noted that FIG. 4 is meant to be representative, and many other configurations of software, drivers, and applications could be described by one skilled in the art. For example, the software in a device at the customer site could be an embedded application implemented using a real-time operating system.

Referring to FIG. 5, the customer site software architecture contains several subsystems that work together to implement the automated problem diagnosis and resolution at the customer site. The customer knowledge base 81 contains entries made up of executable code. Each entry has four parts: the initialization, which contains executable code to register the database entry with the customer site software, the immediate response, which contains executable code to do any processing that requires low latency, the symptom, which contains executable code to determine whether the database entry actually applies, and the solution, which contains executable code to resolve the issue. The scheduler 80 uses the initialization executable code in the database to set up the conditions for the event handler 94 that will activate database entries. When a specified set of conditions arise, the event handler 94 indicates this to the scheduler 80, which in turn activates the relevant database entry. In order to execute the code from the database, the scheduler 80 uses the other components of the customer site software. The software state management 85 manages the process of reading and updating the state of the system software, including that state held in the system registry 72, the system configuration files 71, the BIOS RAM 46, the file system 30, and the PnP manager 68. The hardware state management 87 manages the process of reading and updating the state of the system hardware, including that state held in the network adapters 43, the PnP hardware 49, the other peripherals 51, and the bus 42. The results of the software state management 85 and hardware state management 87 are used by the configuration history recorder/comparator 88 in order to maintain the state history 89. The configuration history recorder/comparator 88 can also determine state changes between previous states of the system and the current state. The configuration analyzer 82 can determine the connectivity of the network, and the traffic recorder 83 monitors and records communications on the network. The secure remote interface 84 uses an encryption scheme to securely communicate information over a public network such as the Internet. For example, the secure remote interface is important when the customer site software initiates a remote support session, because it is enabling the control of potentially damaging operations through a public network. The communications subsystem 90 manages the communication required in order to use more than one machine to diagnose or repair a problem involving the network. The communications subsystem can utilize the networking hardware 91 directly, whereas the other subsystems use the networking software 86 in order to access the networking hardware 91. The persistent state manager 92 uses a state repository 93 in order to keep state information that entries in the customer knowledge base 81 use to control their execution. It should be noted that FIG. 5 represents the customer site software in one embodiment, and that many other implementations of the customer site software could be described by one skilled in the art. For example, the functions illustrated in FIG. 5 could be distributed across several systems in a network operating system.

Referring to FIG. 6, the customer knowledge base is a database made up of a number of fields. The "entry number" field 100 is an integer that uniquely identifies the database entry. These numbers are not reused even if a database entry is discontinued, so there is never any chance of confusing two entries. The "initialization executable code" field 109 is the executable code that is run in order to register the entry with the scheduler and set up the conditions that define when the database entry should be applied by the scheduler. The "immediate response executable code" field 110 is the executable code that is cached locally by the scheduler so that it can be run quickly when the conditions specified by the initialization executable code apply. The "symptom executable code" field 101 is the executable code that is run by the scheduler to test in detail whether or not the database entry applies. The "solution executable code" field 102 is the executable code that is run by the scheduler when the symptom executable code identifies that the database entry does apply. The solution executable code is the set of actions that actually resolve the problem. The "short (summary) descriptive text" field 103 is a one-line description of the database entry that is used to identify it in event logs. The "long (detailed) descriptive text" field 104 is an accurate description of the database entry that is used to explain the operation of the software to the customer when asked to provide more information. The "severity level of problem" field 105 is an integer that describes how serious the problem is. The action of the customer site software in alerting the customer of the problem can be configured to depend on thresholds based on the severity level of the problem. The "danger level of implementing solution" field 106 is an integer that describes how invasive the solution is for the customer system. The action of the customer site software in seeking permission to apply the solution can be configured to depend on thresholds based on the danger level of implementing the solution. The "entry source" field 107 indicates where the database entry originated. This field is digitally signed using public-key encryption methods so that it can be used to authenticate the source of the database entry. The customer site software can then be configured to only use database entries from "trusted" sources. The "total number of times solution has been used" field 108 is a count of the number of times the solution executable code 102 has been applied at all customer sites. It should be noted that FIG. 6 represents the database design in one embodiment, and that many other database designs of the customer knowledge base could be described by one skilled in the art. For example, the customer knowledge base could be implemented as an object-oriented database.

Figure 7:
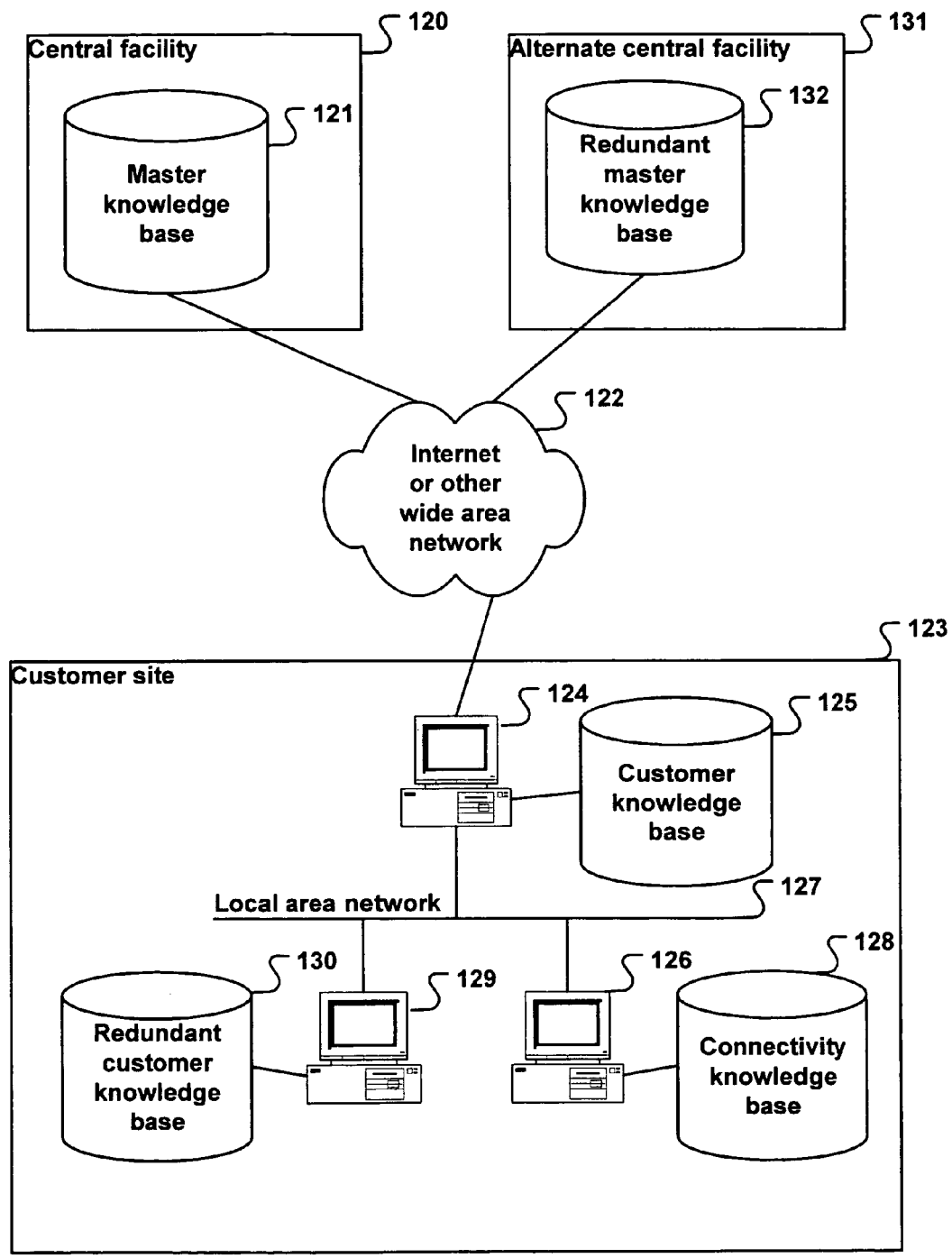
FIG. 7 is a block diagram of the tiered nature of the knowledge base.

Referring to FIG. 7, the knowledge base is organized in a tiered fashion, where increasingly local knowledge bases are smaller but can be accessed more reliably and rapidly. The master knowledge base 121, which contains all the known database entries for solving problems, is kept at the central facility 120. It can be accessed using the Internet or other wide area network 122, but is shared by all customers and may not be available if network connectivity is not functioning. The customer knowledge base 125 is a subset of the master knowledge base 121, and is kept on a customer machine 124 at the customer site 123. It can be accessed using the local area network 127, and is only shared by the machines at the customer site 123. Each machine 126 at the customer site 123 keeps an even smaller subset 128 of the customer knowledge base 125 that contains enough information to solve connectivity problems involving the local area network 127. This connectivity knowledge base 128 is not shared by any other machine and does not require any network in order to access it. Keeping a redundant copy 130 of the customer knowledge base 125 that is maintained by a different machine 129 can increase the accessibility (both reliability and performance) of the customer knowledge base 125. Similarly, keeping a redundant copy 132 of the master knowledge base 121 at an alternate central facility 131 can increase the accessibility (both reliability and performance) of the master knowledge base 121. It should be noted that FIG. 7 is meant to be representative, and many other organizations of the knowledge base could be described by one skilled in the art. For example, the master knowledge base could be distributed as well as being replicated.

FIG. 8A and FIG. 8B show the pseudocode for the executable code contained in a database entry. The sample database entry is designed to handle a problem in which the user attempts to send a message using Microsoft Exchange, and receives an error dialog saying "The message recipient's mailbag does not exist or is busy. Contact your administrator." The cause of the problem is that the post office is located on a Novell 3.11 server, which does not immediately respond to the "File Open" request from Exchange (perhaps because the server is doing a backup). This causes Exchange to repeat the request, which puts the server into a state where it always responds with a "File Already Open" failure. The underlying cause of the error is a problem with the long filename support on the server, so a workaround for the problem is to disable long filename support on the client. This is done by adding a binary value with the name "supportlfn" and the value 0 to the registry key "HKEY_LOCAL_MACHINE\System\CurrentControlSet\Services\VxD\NWREDIR", then restarting the system. In the executable code for the initialization, step 190 starts the process of registering the database entry with the scheduler. Step 191 adds a condition that the entry only applies if the Microsoft Exchange product is running. Step 192 adds a condition that the entry only applies if an error dialog has been created with the text "The message recipient's mailbag does not exist or is busy. Contact your administrator." Step 193 finalizes the process of registering the database entry with the scheduler. In the executable code for the immediate response, information is retrieved about the error dialog that is displayed, since that information must be obtained before the user closes the dialog box. Step 194 retrieves a handle for that dialog box, and then step 195 uses that handle to retrieve a handle for the process that created the dialog box. In the executable code for the symptom, step 140 uses the result of step 195 in order to make sure that the process that created the error dialog is indeed Microsoft Exchange. Step 141 checks to make sure that the electronic mail application being used on the system is Microsoft Exchange. Step 142 determines the name of the post office file, and step 143 determines the machine where that file is physically located. Step 144 uses remote execution, where the code is actually executed on the remote machine, to check and make sure that the mail server is running Novell version 3.11. Step 145 attempts to open the post office file, and step 146 verifies that the operation failed with a "File Already Open" failure. Step 147 closes the post office file, just in case the open was successful. If any of the tests up to this point did not pass, the code returns a FALSE value, but if all the tests succeeded, then step 148 returns a TRUE value, indicating that the database entry does apply, and that the solution should be executed. In the executable code for the solution, step 149 finds the registry key that must be updated on the client. Step 150 checks to see if the registry key does not exist. If it does not, then step 151 logs an error message and step 152 returns FALSE, indicating that the solution failed. If the registry key does exist, then step 153 adds the required binary value, and step 154 restarts the machine. The customer site software is set up to continue execution of the rule after a system restart, so step 155 then returns a TRUE value, indicating that the solution was applied successfully. Note that FIG. 8A and FIG. 8B are not written using any specific programming language. Any programming language can be used to create database entries as long as an interface layer is created for it to implement the dynamic loading and execution functions required by the scheduler. Also, it should be noted that FIG. 8A and FIG. 8B are meant to be representative, and many other implementations of knowledge base programming could be described by one skilled in the art. For example, the remote execution mechanism could be implemented by adding a parameter to each primitive indicating the machine on which that primitive should be run.

Figure 9A:
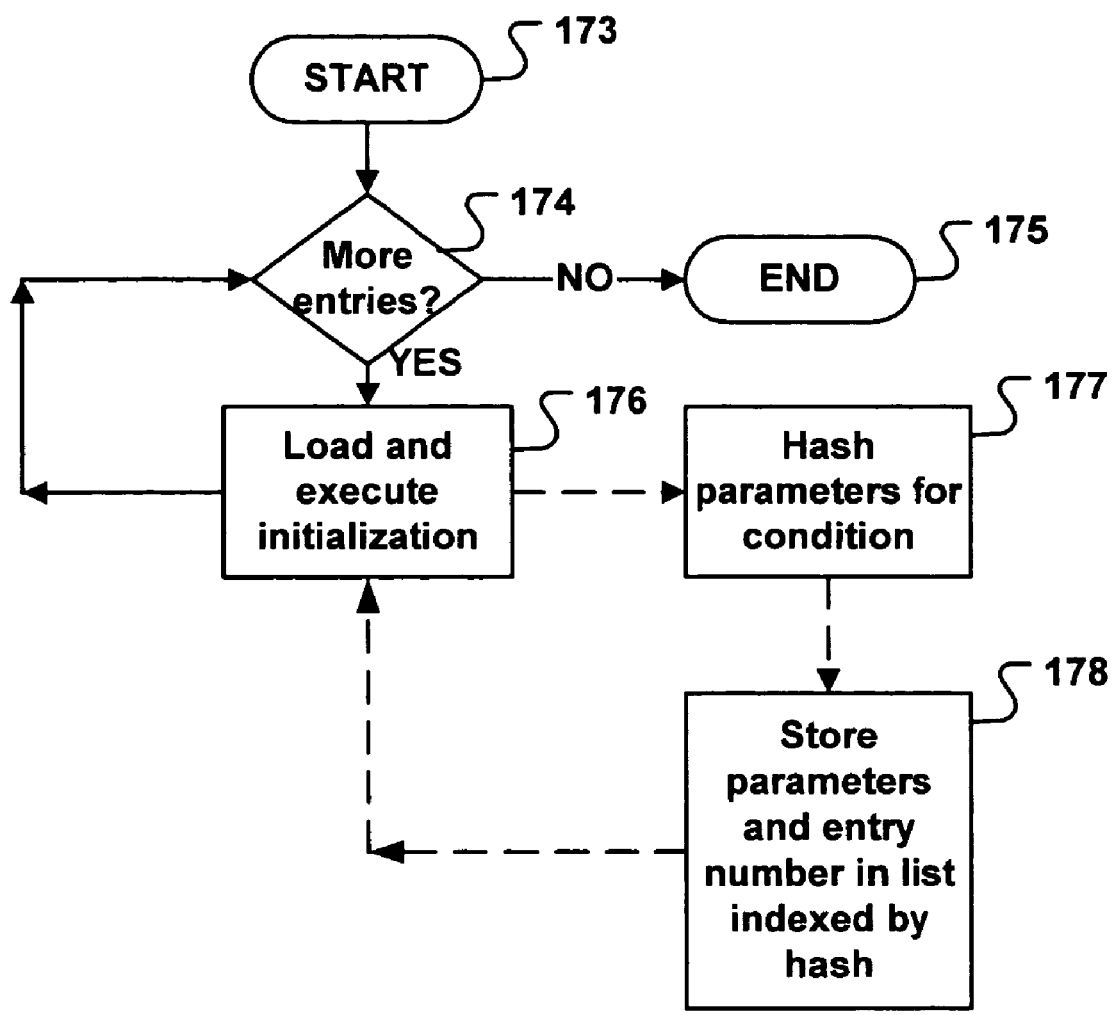
FIGS. 9A, 9B, and 9C are a flowchart of the scheduler's processing of a database entry.
Figure 9B:
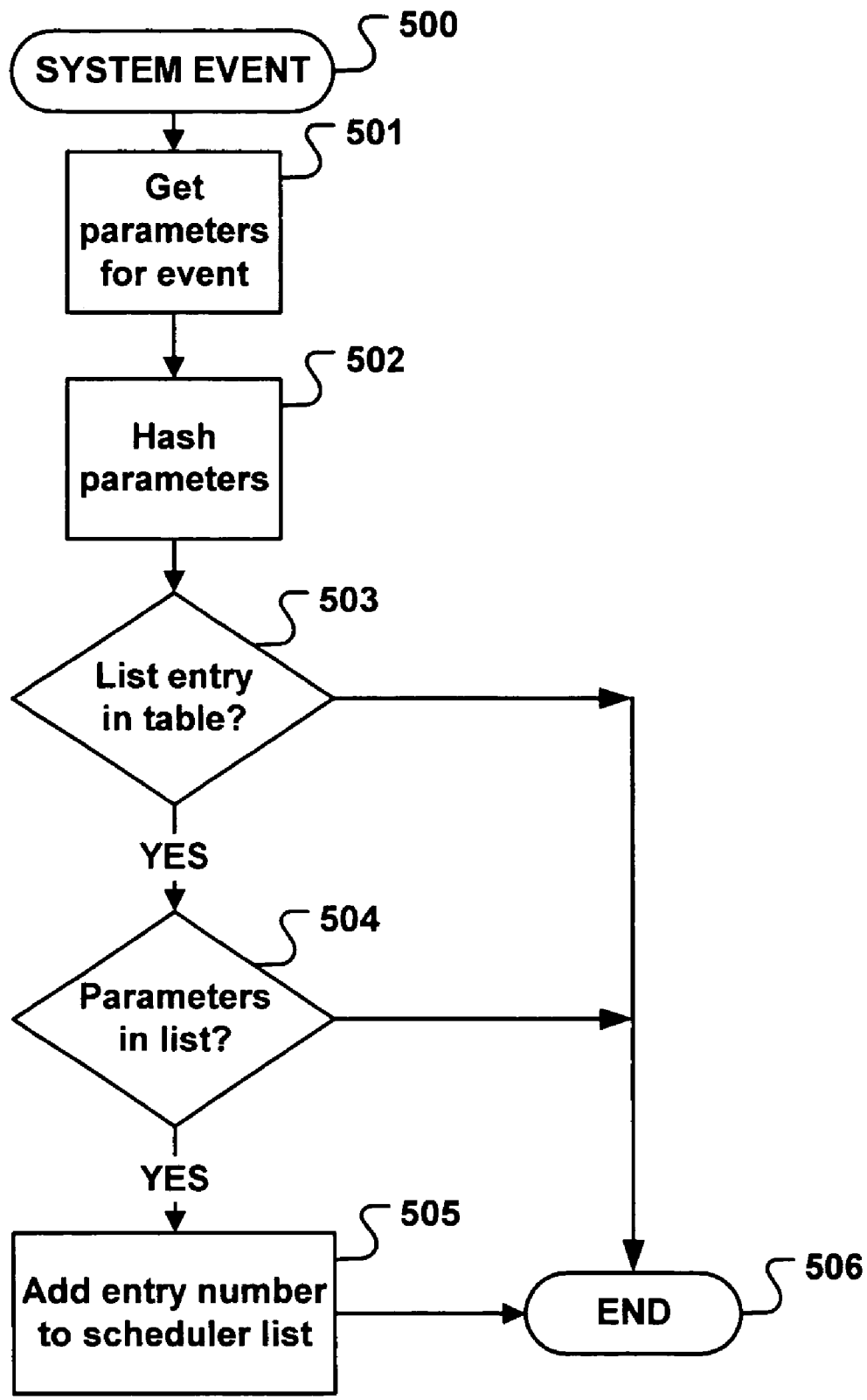
Figure 9C:
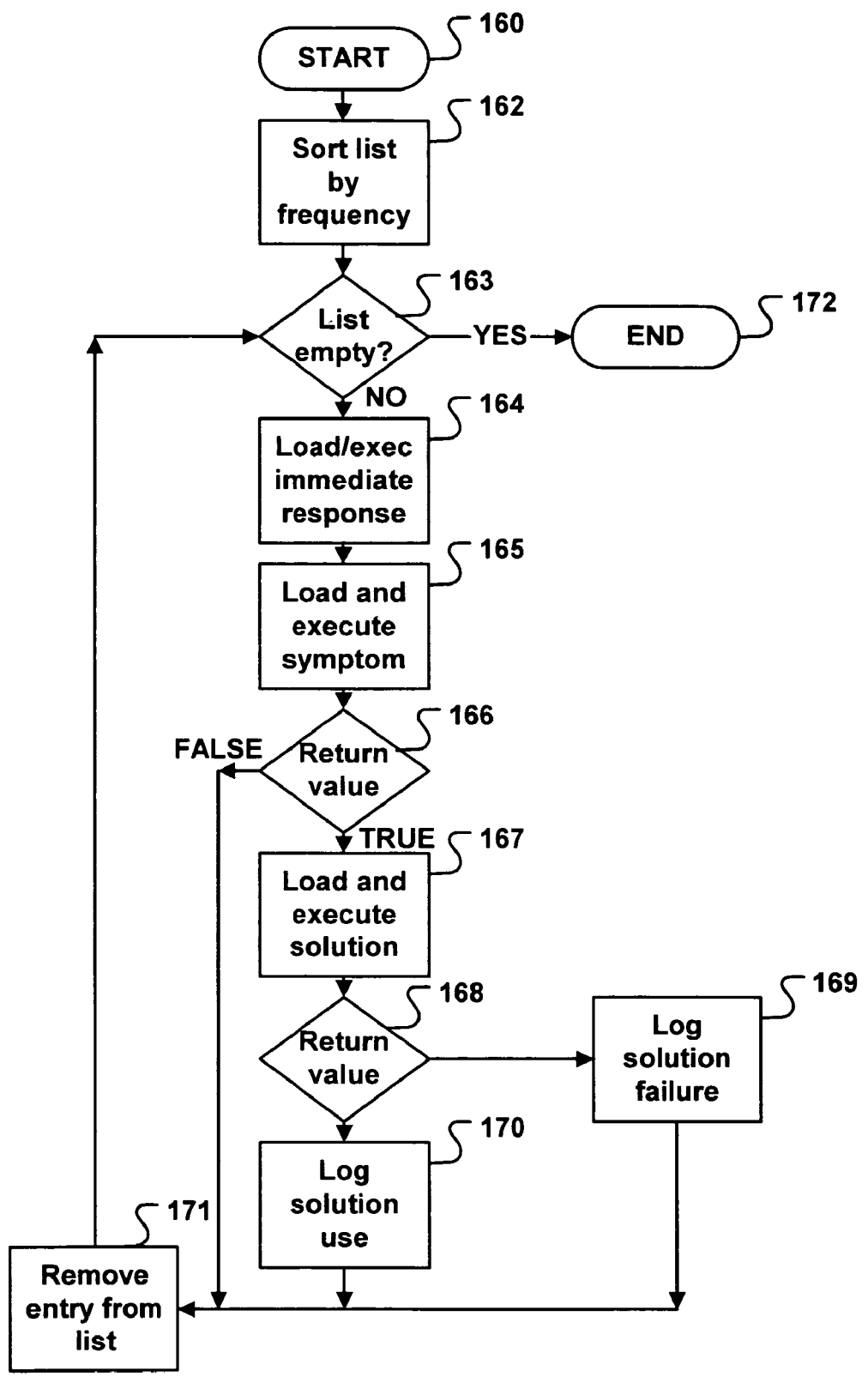

FIG. 9A, FIG. 9B, and FIG. 9C illustrate the mechanism by which the scheduler 80 in the customer site software 61 controls the execution of entries in the customer knowledge base 81. Referring to FIG. 9A, the process starts while the scheduler 80 is initializing the event handler 94, at step 173. Step 174 checks to see if there are any more entries in the customer knowledge base 81. If not, this stage of the process ends at step 175. If so, step 176 loads and executes the initialization executable code for the next entry. As a result of this execution, steps 177 and 178 may be called multiple times as a subroutine. Step 177 takes the parameters for the condition that are passed to it and creates a hash code from them. Step 178 uses that hash code to index a table that corresponds to the condition, and then stores the parameters and the database entry number in a list at that position in the table. As an example, step 192 (in FIG. 8A) would cause step 177 to create a hash code from the parameter ERROR_DIALOG and the text string "The message recipient's mailbag does not exist or is busy. Contact your administrator." Step 178 would then check the table corresponding to dialog creation, at the location indexed by that hash code, and retrieve the (possibly empty) list at that location. It would then add the parameters ERROR_DIALOG and the text string "The message recipient's mailbag does not exist or is busy. Contact your administrator.", along with the database entry number, to that list.

FIG. 9B shows the process of handling a system-level event. Step 500 starts the process when the event happens. Step 501 gets the parameters associated with the event. For example, if the event were caused by dialog creation, the parameters would be the title, type, and text of the dialog. Step 502 computes a hash code from those parameters, and step 503 checks to see if there is a list in the appropriate table, at the location indexed by the hash code. If not, the process ends at step 506. If so, step 504 checks to see if the parameters associated with the event are in the list found in step 503. If not, the process ends at step 506. If so, the database entry number associated with the parameters that were found in the list is determined, and step 505 adds that database entry number to a list that is processed by the scheduler.

FIG. 9C shows the process that the scheduler uses for processing the list that is created in step 505. The process starts at step 160 when the list is non-empty. Step 162 sorts the list in decreasing order of frequency, using the "total number of times solution has been used" field 108 in the knowledge base. This ordering means that the more common problems will be addressed first, in the case where more than one problem happens at the same time. Step 163 then selects the next database entry from the list; if no entries are left in the list, the process finishes at step 172. Step 164 loads and executes the immediate response executable code for the selected entry. This can be done fairly quickly since the immediate response executable code is cached in a local memory where it can be accessed rapidly. Step 165 loads and executes the symptom executable code for the entry. Step 166 checks the result of running the symptom executable code to determine whether the solution for the entry should be applied. If this entry does not apply, the process proceeds to the next entry at step 171. Otherwise, step 167 loads and executes the solution executable code for the entry. Note that the process of loading both the symptom and solution executable code may take some time, since that code is stored in the customer knowledge base, which may be on another machine at the customer site. After executing the solution executable code, step 168 checks the return value of the executable. If it is FALSE, indicating a failure, step 169 logs the solution failure for diagnostic purposes. If the return value is TRUE, indicating a successful solution, step 170 logs the solution use, which will eventually be incorporated at the central facility into the "total number of times solution has been used" field 108 in the knowledge base. In either case, step 171 removes the current database entry from the list of entries being considered, and proceeds to step 163 to process the next entry. It should be noted that FIG. 9A, FIG. 9B, and FIG. 9C all represent the scheduler implementation in one embodiment, and many alternative implementations to the scheduler algorithm could be described by one skilled in the art.

Figure 10:
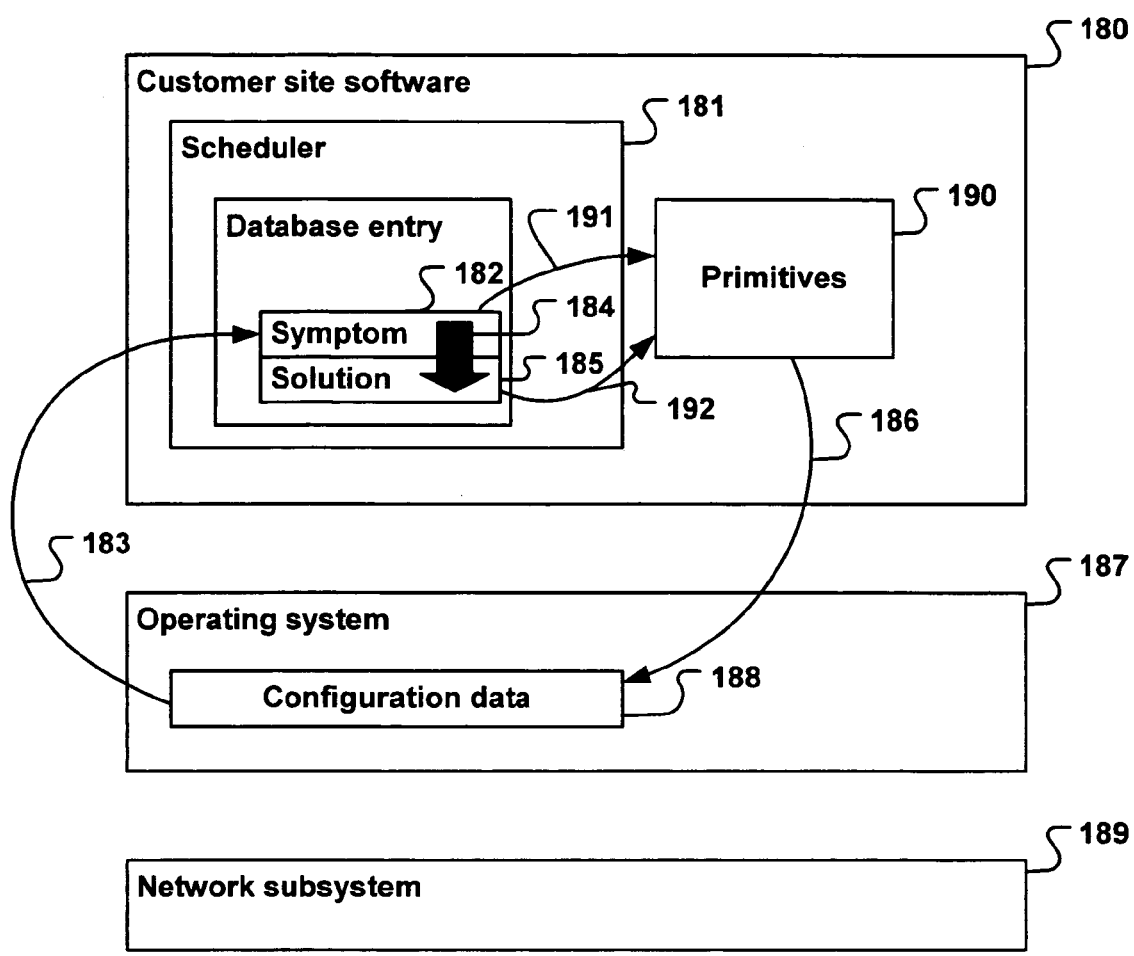
FIG. 10 is a block diagram of the operation of the customer site software.

FIG. 10 shows the general method that the customer site software uses for executing the code for the symptom and solution parts of the knowledge base in order to automatically diagnose and resolve problems. The customer site software 180 contains a scheduler 181 that can load and execute the code in the symptom 182 and the solution 185. In the process of executing the symptom 182, the scheduler 181 utilizes 191 the primitives 190, which interface 186 to the operating system 187 in order to obtain configuration data 188 to incorporate 183 into the test whether the symptom is TRUE. If the symptom is TRUE, this implies 184 that the solution 185 should be loaded and executed by the scheduler 181. In the process of executing the solution 185, the scheduler 181 utilizes 192 the primitives 190, which interface 186 to the operating system 187 in order to update the configuration data 188, repairing the problem. In this mode of operation, the network subsystem 189 is not utilized. It should be noted that FIG. 10 intentionally omits the participation of the initialization code 109 and immediate response code 110 for the sake of clarity. Also, FIG. 10 represents the customer site software architecture in one embodiment, and many alternative customer site software architectures could be described by one skilled in the art.

FIG. 11 shows the method that the customer site software uses for executing code that requires the use of more than one computer to solve a problem. Computer A 200 is running customer site software 203, which uses scheduler 201 to load and execute symptom code 205 and solution code 206 from an entry in the customer knowledge base 204. As previously described, scheduler 201 uses primitives that interface to the operating system 207 in order to read and modify the configuration data 208. Similarly, computer B 210 is running customer site software 213, which uses scheduler 211 to load and execute symptom code 215 and solution code 216 from an entry in the customer knowledge base 214. As previously described, scheduler 211 uses primitives that interface to the operating system 217 in order to read and modify the configuration data 218. If the symptom code 205 or solution code 206 on computer A 200 needs to read or modify state configuration data 218 on computer B 210, it does so by providing remote interface 202 with the parameters for the executable code needed to implement the desired action. This in turn uses network subsystem 209 to communicate with network subsystem 219, which uses remote interface 212 to run the executable code with the given parameters using scheduler 211. The scheduler 211 uses remote interface 212 to return any results through network subsystem 219 and network subsystem 209 to remote interface 202, which in turn returns the results to scheduler 201. Similarly, if the symptom code 215 or solution code 216 on computer B 210 needs to read or modify state configuration data 208 on computer A 200, it does so by providing remote interface 212 with the parameters for the executable code needed to implement the desired action. This in turn uses network subsystem 219 to communicate with network subsystem 209, which uses remote interface 202 to run the executable code with the given parameters using scheduler 201. The scheduler 201 uses remote interface 202 to return any results through network subsystem 209 and network subsystem 219 to remote interface 212, which in turn returns the results to scheduler 211. In this way, multiple machines can cooperate to implement solutions that require the use of resources spanning the network. It should be noted that FIG. 11 intentionally omits the participation of the initialization code 109 and immediate response code 110 for the sake of clarity. Also, FIG. 11 represents the remote execution implementation in one embodiment, and many alternative implementations of remote execution could be described by one skilled in the art.

FIG. 11 can be used to describe a specific implementation instance. For example, we describe a case where Computer A 200 must update local operating system 207 configuration data 208 to properly configure a peripheral, and the correct values for the configuration data 208 must be determined by examining both existing configuration data 208 on Computer A 200 and existing configuration data 218 on Computer B 210. To do this, symptom code 205 in the customer knowledge base 204 is loaded and executed by the scheduler 201 within the customer site software 203 on Computer A 200. The symptom code 205 returns the value TRUE, indicating that the solution code 206 must be executed to configure the peripheral. The scheduler 201 then loads and executes the solution code 206. The executing solution code 206 includes instructions to query and return configuration data 218 from Computer B 210. To do this, the solution code 206 uses the remote interface 202 to connect through network subsystem 209 and network subsystem 219 to Computer B 210. Computer B 210 remote interface 212 receives the parameters from Computer A 200 and passes them to scheduler 211 which uses the parameters to retrieve the necessary configuration data 218. The Computer B 210 scheduler 211 then sends the results of this operation back through the remote interface 212 to the remote interface 202 of Computer A 200 using network subsystem 219 and network subsystem 209. The remote interface 202 then returns the results to the solution code 206, which can now resume execution. Once the solution code 206 has determined the correct values for peripheral configuration, the necessary configuration data 208 is added.

Figure 12A:
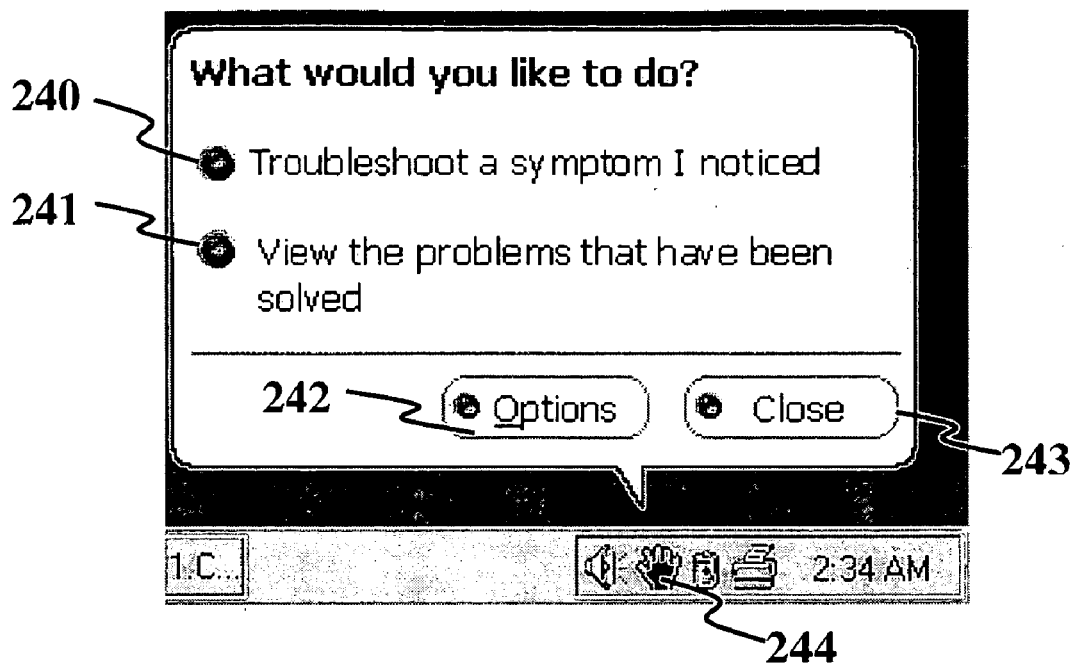
FIGS. 12A, 12B, and 12C show representative screen diagrams of the user interface of the customer site software.
Figure 12B:
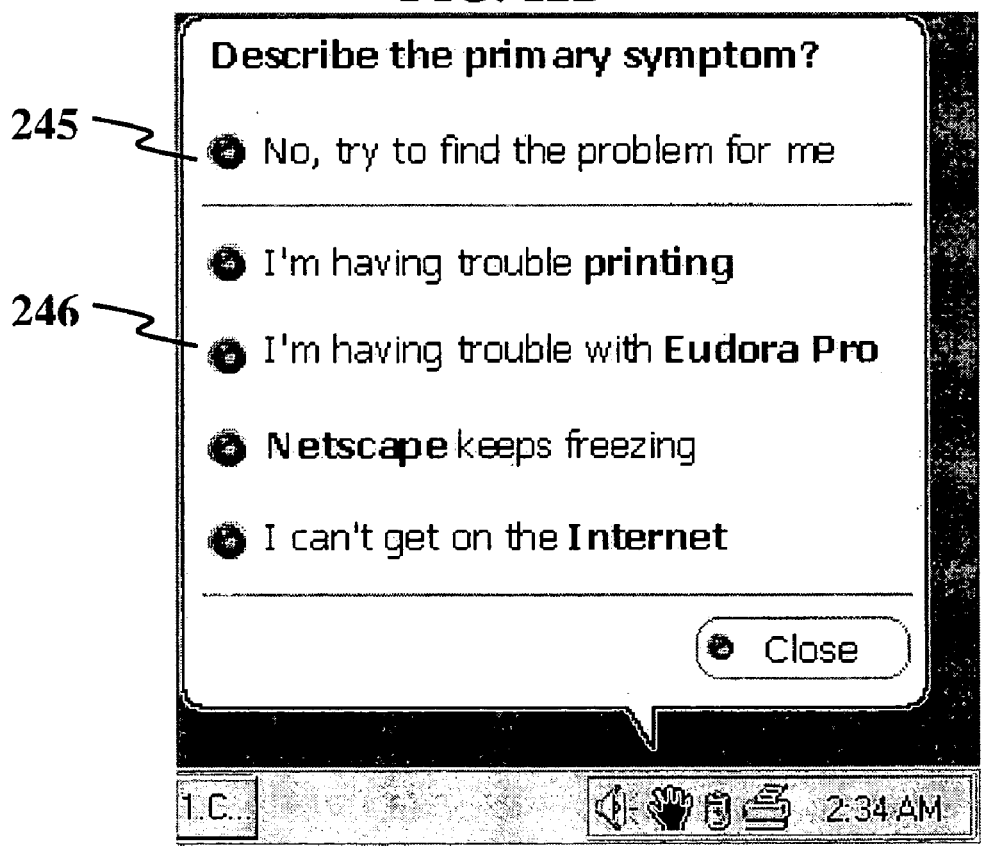
Figure 12C:
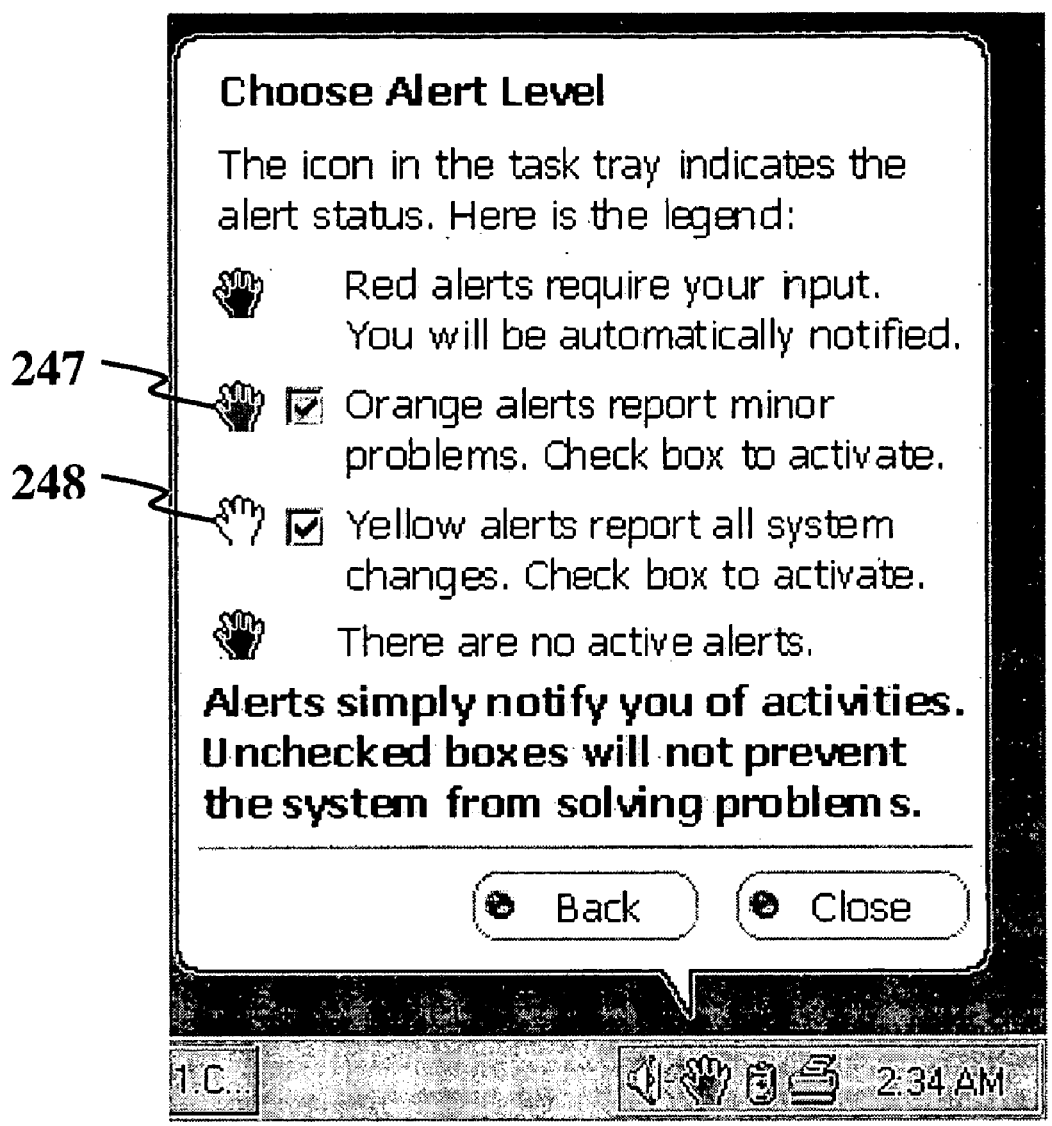

Referring to FIG. 12A, the customer site software allows the customer to initiate action by clicking on the taskbar icon 244. After doing so, a menu appears where the customer can click on a menu item 240 to initiate a diagnosis, or the customer can click on a menu item 241 to view the log that has been created. The customer can also click on a button 243 to remove the menu with no further action, or can click on a button 242 to adjust more options. If the customer selects menu item 240 to initiate a diagnosis, the menu in FIG. 12B is presented, where the customer can select an item 245 to attempt the diagnosis completely automatically, or the customer can choose from a list of items 246 to assist the customer site software in finding the problem quickly and reliably. If the customer selects button 242 to adjust more options, the menu in FIG. 12C is presented, where the customer can use a check box 247 to enable the reporting of minor problems, and can use another check box 248 to enable the reporting of all problems. It should be noted that FIG. 12A, FIG. 12B, and FIG. 12C are meant to be representative, and many other user interface designs could be described by one skilled in the art. For example, a web-based user interface might allow a user to interact with the customer site software on a remote machine using an HTTP interface and a web browser.

Figure 13:
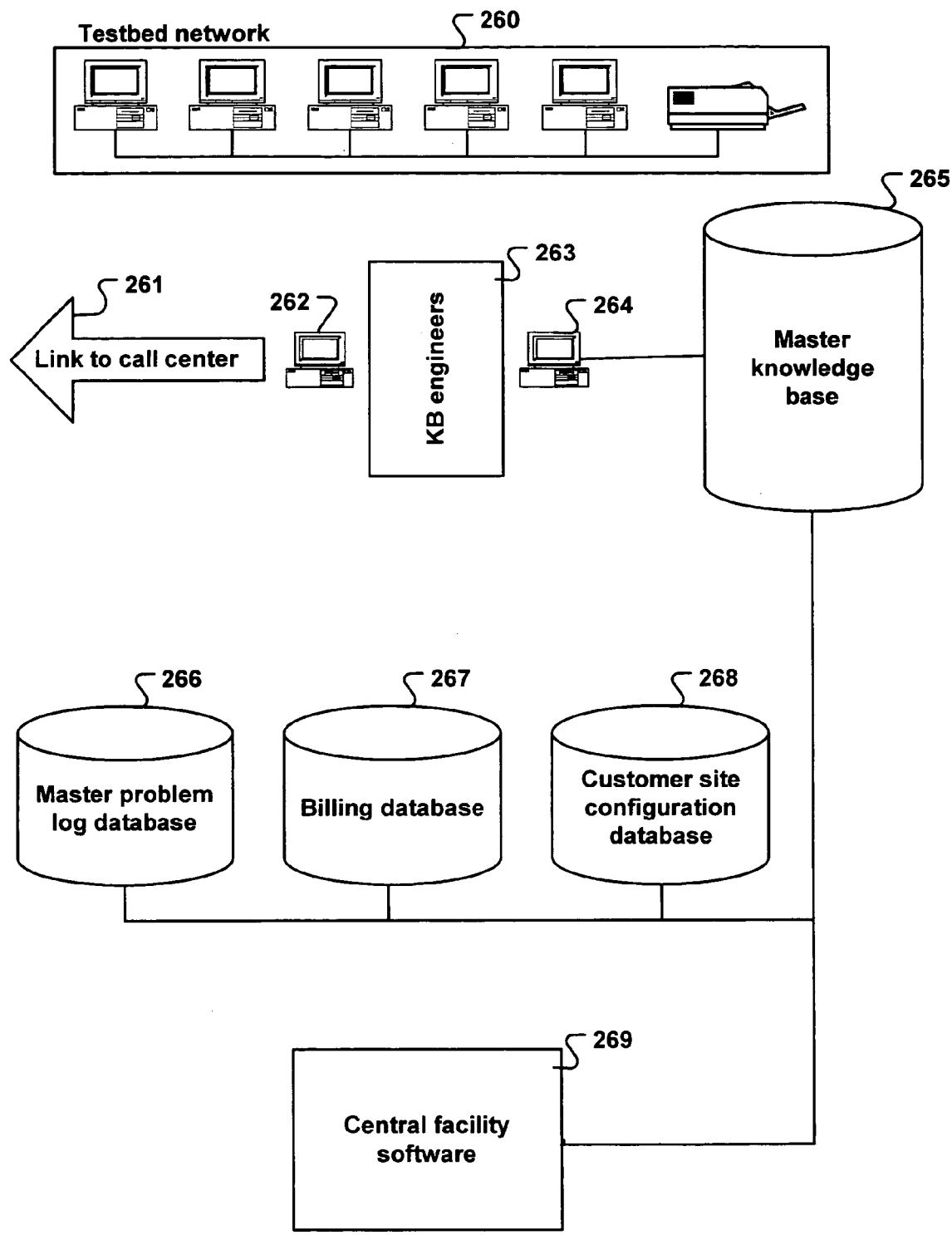
FIG. 13 is a block diagram of the central facility.

Referring to FIG. 13, the central facility contains a number of hardware components. The knowledge base engineers 263 are responsible for creating and maintaining the master knowledge base 265. They use the testbed network 260 to find and reproduce problems, discover solutions, and test new entries for the master knowledge base 265. The master knowledge base 265 is accessed through a database programming interface 264. The knowledge base engineers 263 also have access to information from the call support center through the same interface 262 that the support engineers use, implemented over a link 261 to the call center. The central facility software 269 manages the server side of the process of updating the customer knowledge bases, as well as managing the server side of remote support sessions. The master problem log database 266 stores information, gathered from the customer sites during the knowledge base update process, about automated problem solutions. The billing database 267 is used to drive the customer billing process. The customer site configuration database 268 contains information about the network software and hardware configuration of all customers. This information is used to implement the customer knowledge base update process. It should be noted that FIG. 13 is meant to be representative, and many other organizations of the central facility could be described by one skilled in the art. For example, the database functions described could be consolidated into a single enterprise database system.

Referring to FIG. 14, the master knowledge base is a database made up of a number of fields. The "entry number" field 280 is an integer that uniquely identifies the database entry. Entry numbers are not reused even if a database entry is discontinued, so there is never any chance of confusing two database entries. The "initialization executable code" field 291 is the executable code that is run in order to register the entry with the scheduler and set up the conditions that define when the database entry should be applied by the scheduler. The "immediate response executable code" field 298 is the executable code that is cached locally by the scheduler so that it can be run quickly when the conditions specified by the initialization executable code apply. The "symptom executable code" field 281 is the executable code that is run by the scheduler to test in detail whether or not the database entry applies. The "solution executable code" field 282 is the executable code that is run by the scheduler when the symptom executable code identifies that the database entry does apply. The solution executable code is the set of actions that actually resolve the problem. The "short (summary) descriptive text" field 283 is a one-line description of the database entry that is used to identify it in event logs. The "long (detailed) descriptive text" field 284 is an accurate description of the database entry that is used to explain the operation of the software to the customer when asked to provide more information. The "severity level of problem" field 285 is an integer that describes how serious the problem is. The action of the customer site software in alerting the customer of the problem can be configured to depend on thresholds based on the severity level of the problem. The "danger level of implementing solution" field 286 is an integer that describes how invasive the solution is for the customer system. The action of the customer site software in seeking permission to apply the solution can be configured to depend on thresholds based on the danger level of implementing the solution. The "total number of times solution has been used" field 287 is a count of the number of times the solution executable code 282 has been applied at all customer sites. The "date/time created" field 288 indicates when the database entry was first added to the master knowledge base. The "date/time of last modification" field 289 indicates the last time the database entry was modified. The "configurations for which entry applies" field 290 indicates the type of software and hardware that must be present at the customer site in order for the database entry to apply, and is used during the process of extracting the customer knowledge base from the master knowledge base. The "original source" field 292 indicates what party originally created the database entry, and the "last group that modified" field 293 indicates what party last made substantial changes to the meaning of the database entry. Fields 292 and 293 are digitally signed using public-key encryption methods so that they can be used to authenticate the source of the database entry. The customer site software can then be configured to only use database entries from "trusted" sources. Fields 292 and 293 can also be used to track ownership, for situations when licensing fees depend on use of the information in the database entry. The "revision history" field 294 contains information about when the database entry was modified and for what reason. The "version number of entry" field 295 contains a release version for the database entry, and the "version number of supported software" field 296 contains the version number for the earliest version of the customer site software that will be able to successfully execute the symptom and solution code. These two fields are used to manage automated version upgrades in the customer site software components. The "reference to problem management system" field 297 contains a pointer to the entry in the support center's problem management system that was used in generating the database entry. It should be noted that FIG. 14 represents the database design in one embodiment, and that many other database designs of the master knowledge base could be described by one skilled in the art. For example, the master knowledge base could be implemented as an object-oriented database.

Referring to FIG. 15, there are several sources for the information that is stored in the master knowledge base. The data format and programming procedures for entering data in the master knowledge base are designed to make it accessible for data entry by a variety of parties. The sources of information about the actual problems and solutions being represented can be existing text-based symptom/solution information, either from hardware manufacturers 300, software manufacturers 301, or knowledge base resellers 302. It can also be information from customers 303 that comes through the call center by way of the problem management system. Information can also originate from publications, both paper and electronic, including professional network management publications 304 as well as more informal publications and message boards 306. For master knowledge base entries that originate within the company 305, the information can be discovered using the testbed network 260, either in the course of refining the solution for a problem, or in discovering completely new problems as a by-product of using the network. It should be noted that FIG. 15 is merely a representative list. There are other existing sources, and will continue to be new sources, of information for the master knowledge base that may be apparent to one skilled in the art.

Figure 16:
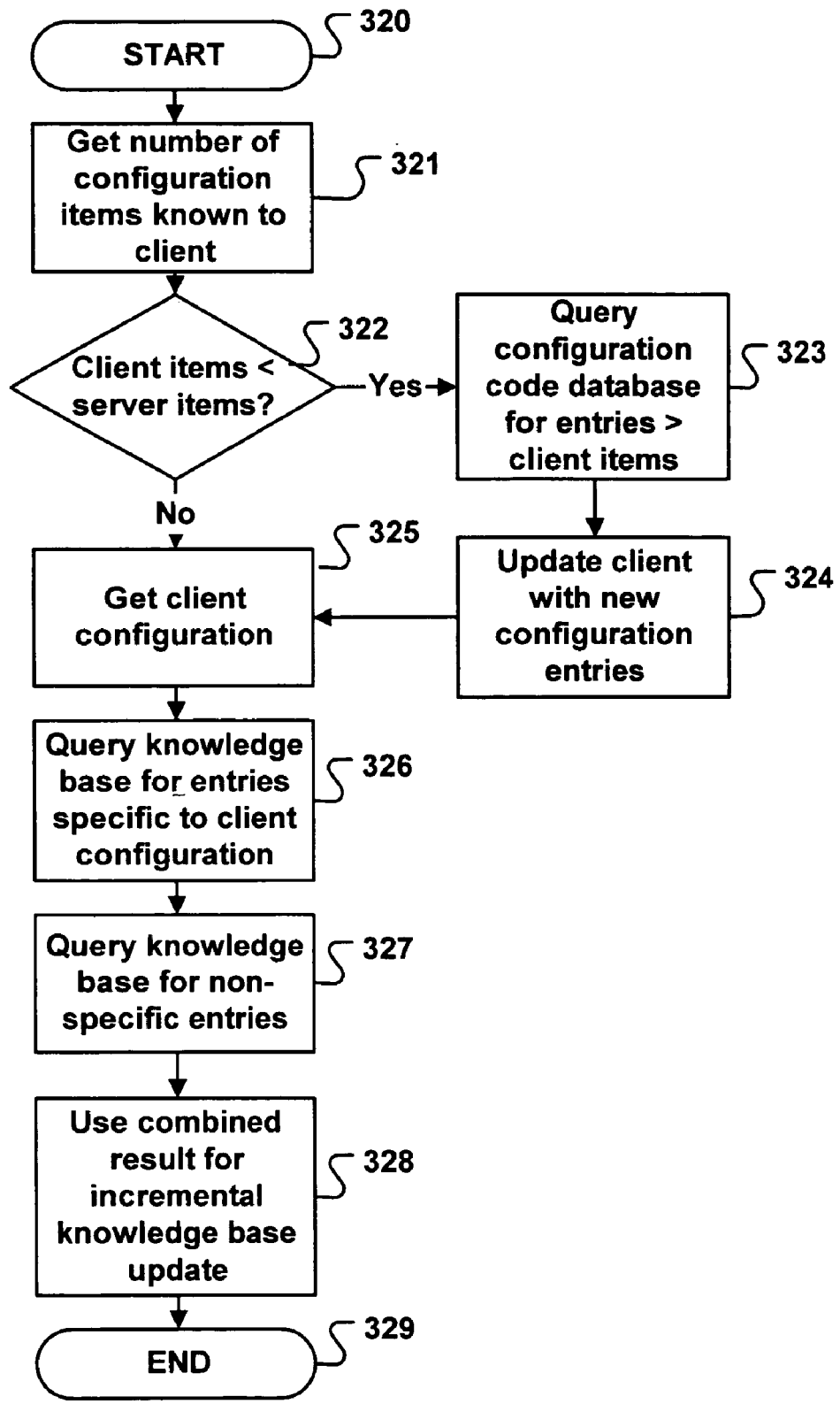
FIG. 16 is a flowchart of the process used to extract the customer knowledge base from the master knowledge base.

FIG. 16 shows the process used to extract the customer knowledge base from the master knowledge base. In this process, the central facility software, accessing the master knowledge base, acts as the server, and the customer site software, updating the customer knowledge base, acts as the client. Step 320 begins the process. The first part of the process is to synchronize the server and client in terms of the software and hardware configuration information they understand. This configuration information is represented as an enumerated list of items. For example, a specific version of an application would be a single item in the list, as would a specific model number of printer. Each configuration item is numbered sequentially and has executable code associated with it to determine whether that configuration item is present. The sequential numbers are never reused, so a single number will always refer to the same hardware or software configuration item. These items are stored in a configuration code database. In step 321, the server determines how many different configuration items the client understands. In step 322, the server determines whether the client knows about fewer configuration items. If not, it proceeds to step 325 where it retrieves all the configuration information from the client. If so, it is necessary to update the client with the new configuration items that have been added since the client was last updated. Step 323 queries that database to extract the new items that must be sent to the customer site software, and step 324 sends those items to the customer site software. Then the process proceeds to step 325 to retrieve all the configuration information from the client. Once the server has the client configuration, it is used in step 326 to query the master knowledge base, using the "configurations for which entry applies" field 290 to select the configuration-specific rules that should be in the customer knowledge base. Step 327 queries the master knowledge base to select all the non-configuration-specific rules that need to be in every customer knowledge base. Step 328 combines the results of the two queries to make a list of knowledge base entries that should be in the customer knowledge base. This list is used by the incremental knowledge base update. Step 329 ends the process. It should be noted that FIG. 16 represents the implementation of the customer knowledge base extraction in one embodiment, and that many implementations of the customer knowledge base extraction could be described by one skilled in the art.

Figure 17:
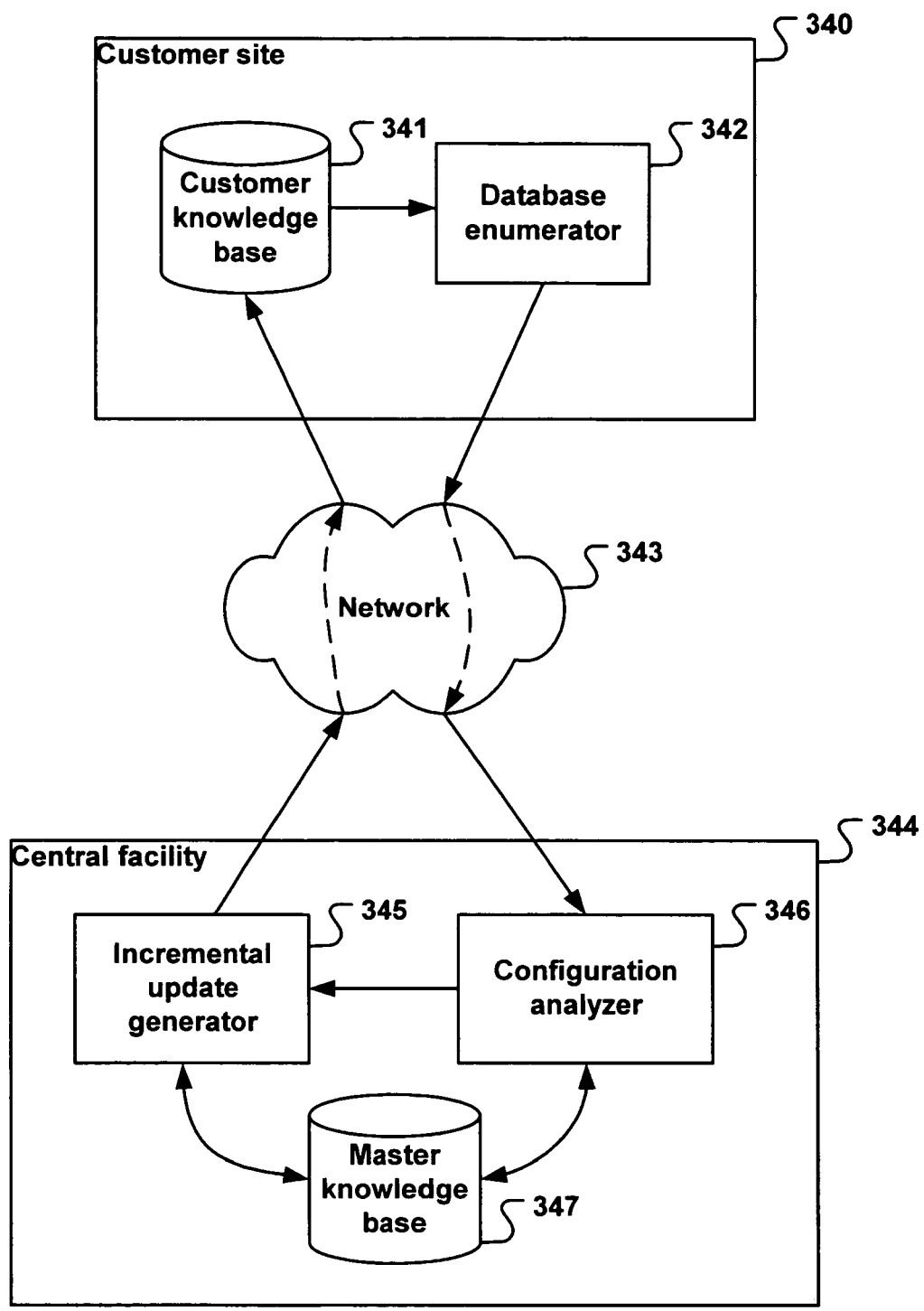
FIG. 17 is a block diagram of the customer knowledge base update.

Referring to FIG. 17, the incremental knowledge base update takes place between the customer site 340 and the central facility 344 using a network 343 such as the Internet or other wide area network. The customer site software initiates the process by using the database enumerator 342 to generate a concise list of the entries that are currently contained in the customer knowledge base 341. This list is transmitted to the configuration analyzer 346, which compares it to the list generated in step 328 of the customer knowledge base extraction and uses the incremental update generator 345 to package the set of changes needed from the master knowledge base 347. These changes are then sent to the customer site software, which uses them to update all copies of the customer knowledge base 341.

Figure 18:
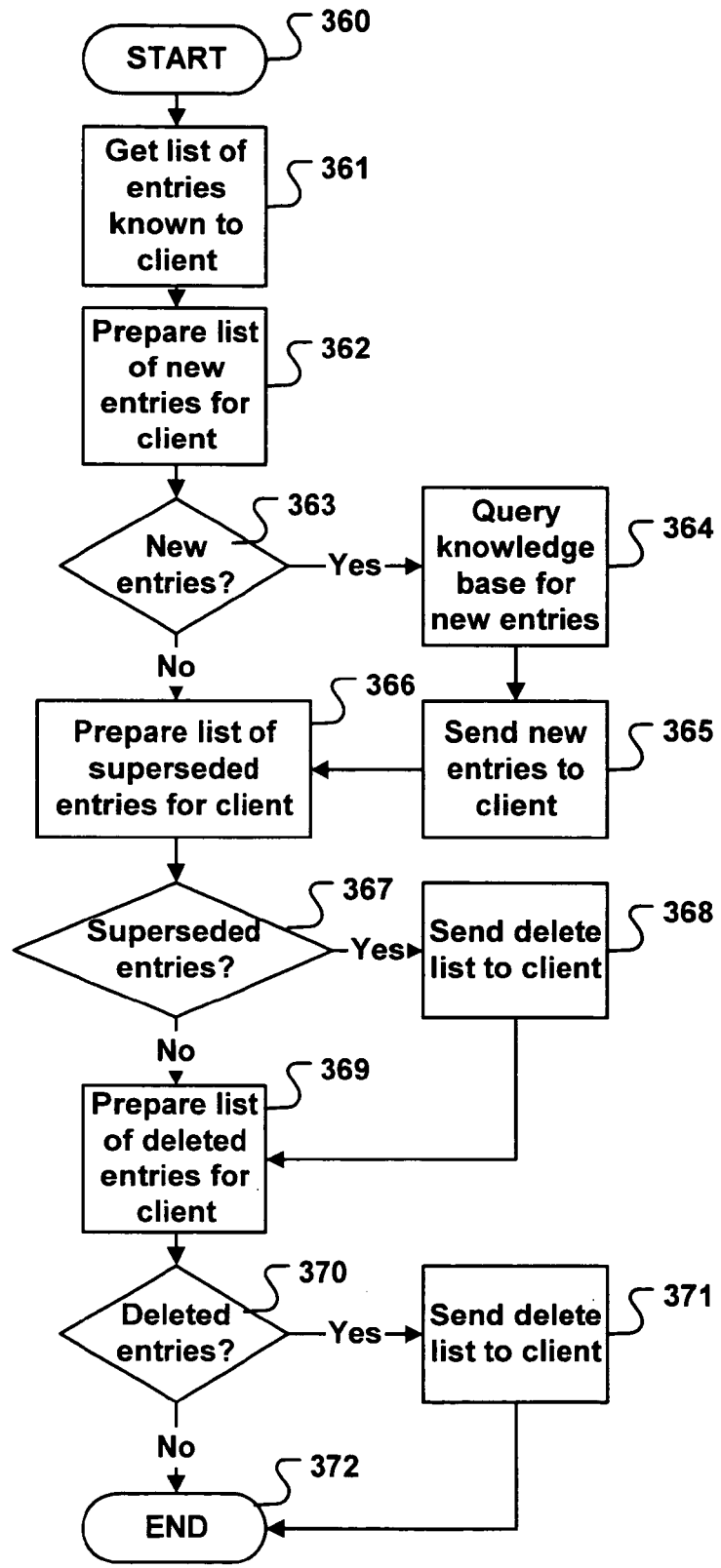
FIG. 18 is a flowchart of the process used to incrementally update the customer knowledge base.

FIG. 18 shows the actual process for the incremental knowledge base update. This process is used by the central facility software to access the master knowledge base and send update information to the customer site software, which acts as the client. Step 360 starts the process. Step 361 retrieves a concise list of the entries that are already in the customer knowledge base. By comparing this list to the list of entries generated in step 328 of the customer knowledge base extraction process, step 362 prepares a list of the new entries that need to be sent to the client for inclusion in the customer knowledge base. Step 363 checks to see if there are any such entries to be sent, and if there are, step 364 gets those entries from the master knowledge base, and step 365 updates the client with those entries. Step 366 then prepares a list of the superseded entries, which are database entries for which a newer version has been added to the database. These entries must be removed from the customer knowledge base, so step 367 checks to see if there are any such entries to be processed, and if so, step 368 sends a list to the client of the entries that must be deleted. Step 369 then prepares a list of database entries that have been completely removed from the master knowledge base, which must be removed from the customer knowledge base as well. Step 370 checks to see if there are any such entries, and if so, step 371 sends a list to the client of the entries that must be deleted. Step 372 ends the process. It should be noted that FIG. 18 represents the incremental knowledge base update implementation in one embodiment, and that many other implementations of the knowledge base update could be described by one skilled in the art.

Figure 19:
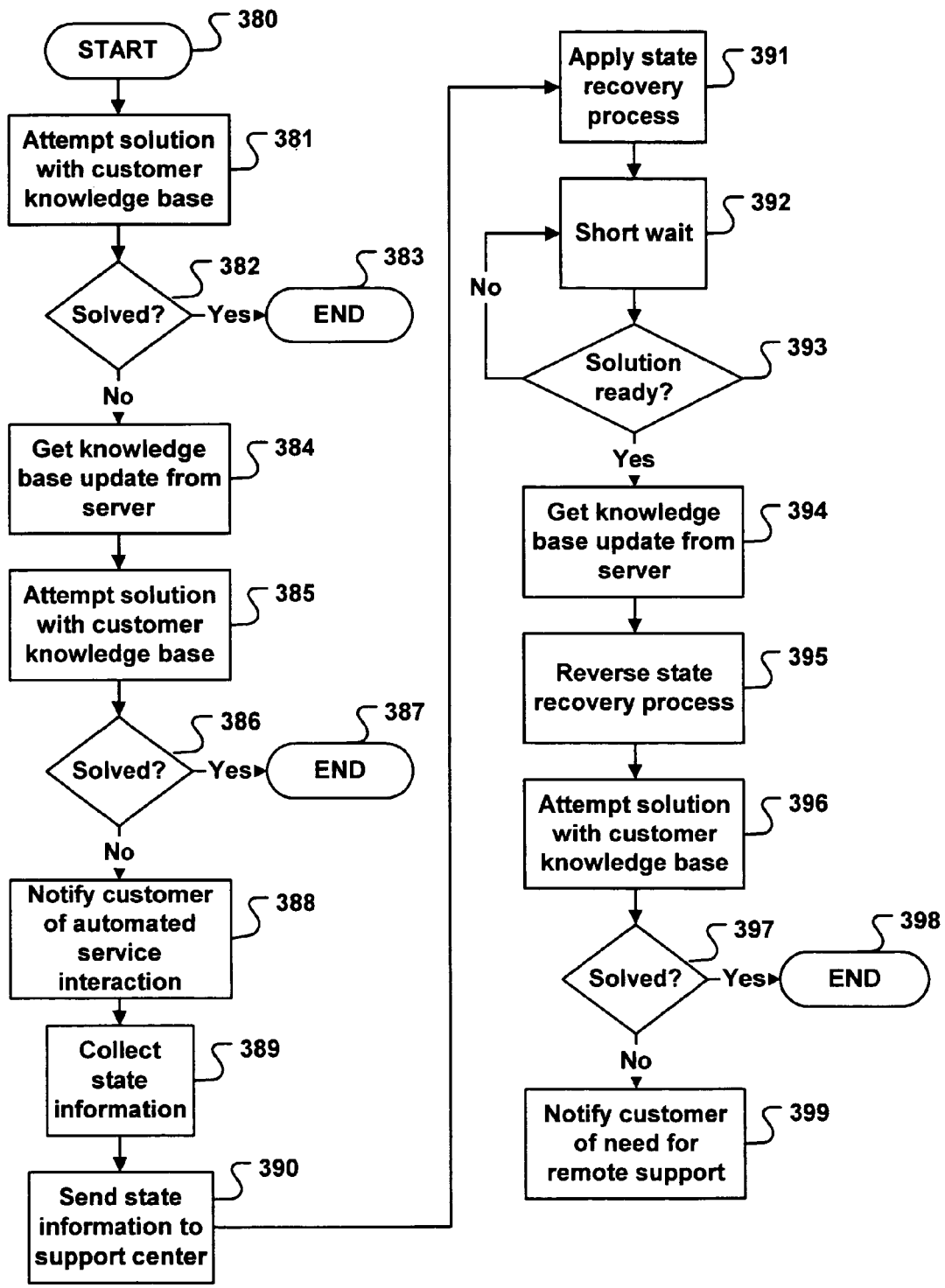
FIG. 19 is a flowchart of the problem escalation sequence.

FIG. 19 shows the entire process by which a problem is escalated to the point where it is solved. Step 380 starts the process. In step 381, the customer site software attempts to solve the problem using the customer knowledge base. Step 382 checks to see if this attempt actually solved the problem, and if so, the process ends at step 383. If not, step 384 updates the customer knowledge base from the master knowledge base. Then step 385 attempts to solve the problem again using the customer knowledge base. Step 386 checks to see if this attempt actually solved the problem, and if so, the process ends at step 387. If not, the solution for the problem is not in the master knowledge base, so the problem must be escalated to the support staff at the call center. Step 388 notifies the customer that this will be happening, so that the customer understands the problem is under consideration. Step 389 collects all state information relevant to the problem, and step 390 forwards it to the call center. After this forwarding, step 391 reverts the state of the system to the point where it works well enough for the customer to use normally. Then steps 392 and 393 wait until the call center staff has solved the problem, checking at frequent intervals. Once the problem has been solved and coded into the master knowledge base, step 394 retrieves the solution by updating the customer knowledge base from the master knowledge base. Step 395 reverses the changes done in step 391, and then step 396 attempts to solve the problem again using the customer knowledge base. Step 397 checks to see if this attempt actually solved the problem, and if so, the process ends at step 398. If not, step 399 informs the customer that the problem solution did not work, and that manual intervention through the remote support process will be needed.

Figure 20:
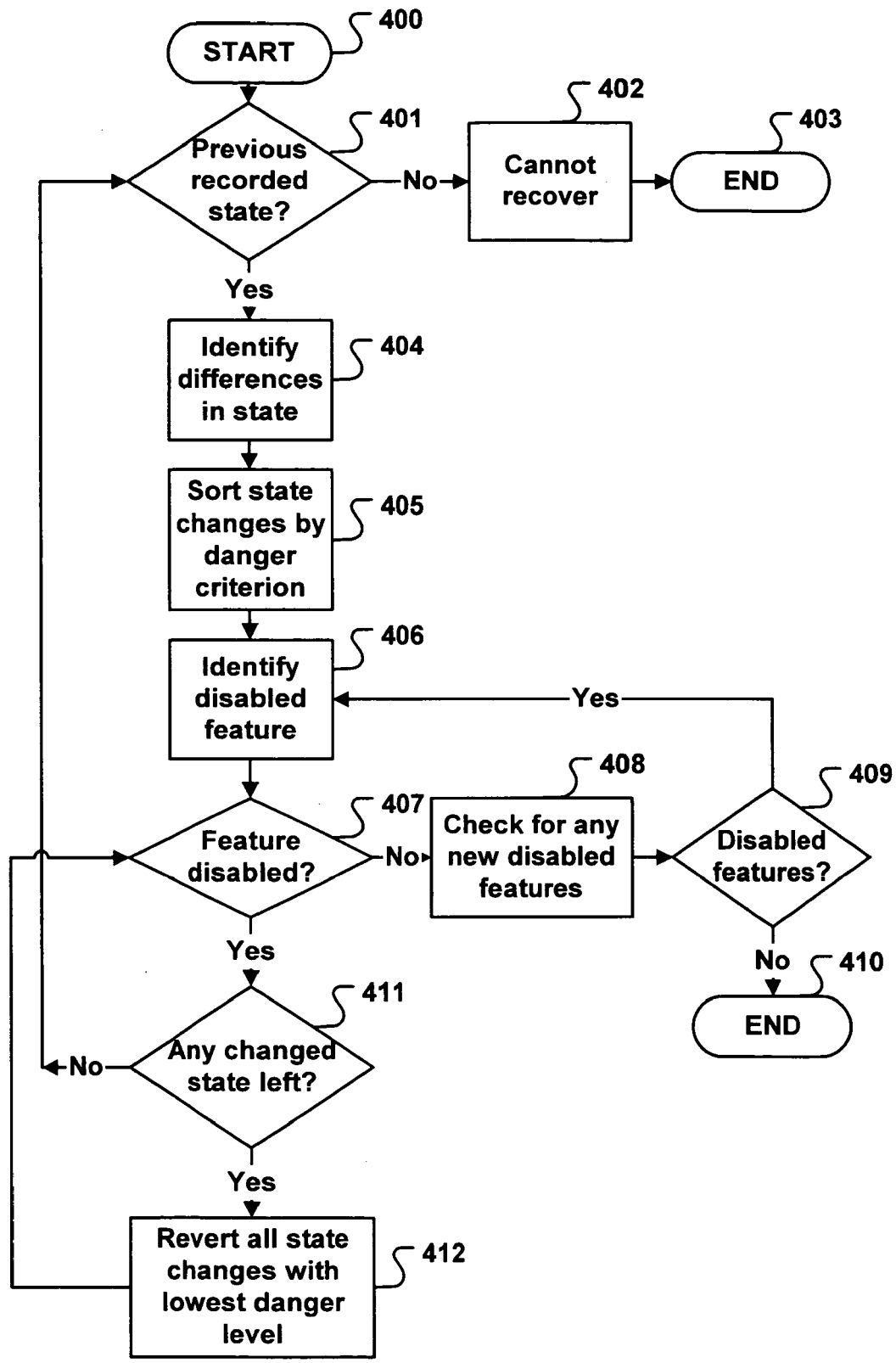
FIG. 20 is a flowchart of the state recovery process.

FIG. 20 details the process by which step 391 reverts the state of the system to a useable state, characterized in that the system works well enough for the customer to use normally. Step 400 starts the process. Step 401 checks whether there is any previously recorded state to use for backing up. If not, step 402 informs the customer that the system functionality cannot be recovered, and the process ends at step 403. If there is previously recorded state, step 404 identifies the differences between the recorded state and the current state. Step 405 then assigns a criterion to each state difference that is based on the significance of the change, the danger in undoing the change, the dependence of other state on the change, and the difficulty to change the state, thereby computing a priority of state changes. The state changes are sorted based on this criterion. Step 406 identifies a critical customer feature that is not working properly. Step 407 checks to see if step 406 was able to identify any disabled critical features. If not, then step 408 identifies any additional disabled features. Step 409 checks to see if step 408 was able to identify any disabled critical features. If not, the system functionality has been restored, and the process ends at step 410. If there are additional disabled critical features, the process returns to step 406 to identify and correct those features. If step 407 does find a disabled critical feature, then step 411 checks to see if there are any more state changes in the sorted list. If not, then the process returns to step 401 to try to revert to a still earlier state. If so, step 412 reverts all of the state represented by the same level of criterion at once, and then returns to step 407 to check whether the currently disabled feature has been restored. It should be noted that FIG. 20 represents the implementation of reverting state in one embodiment, and that many implementations of reverting state could be described by one skilled in the art.

Figure 21:
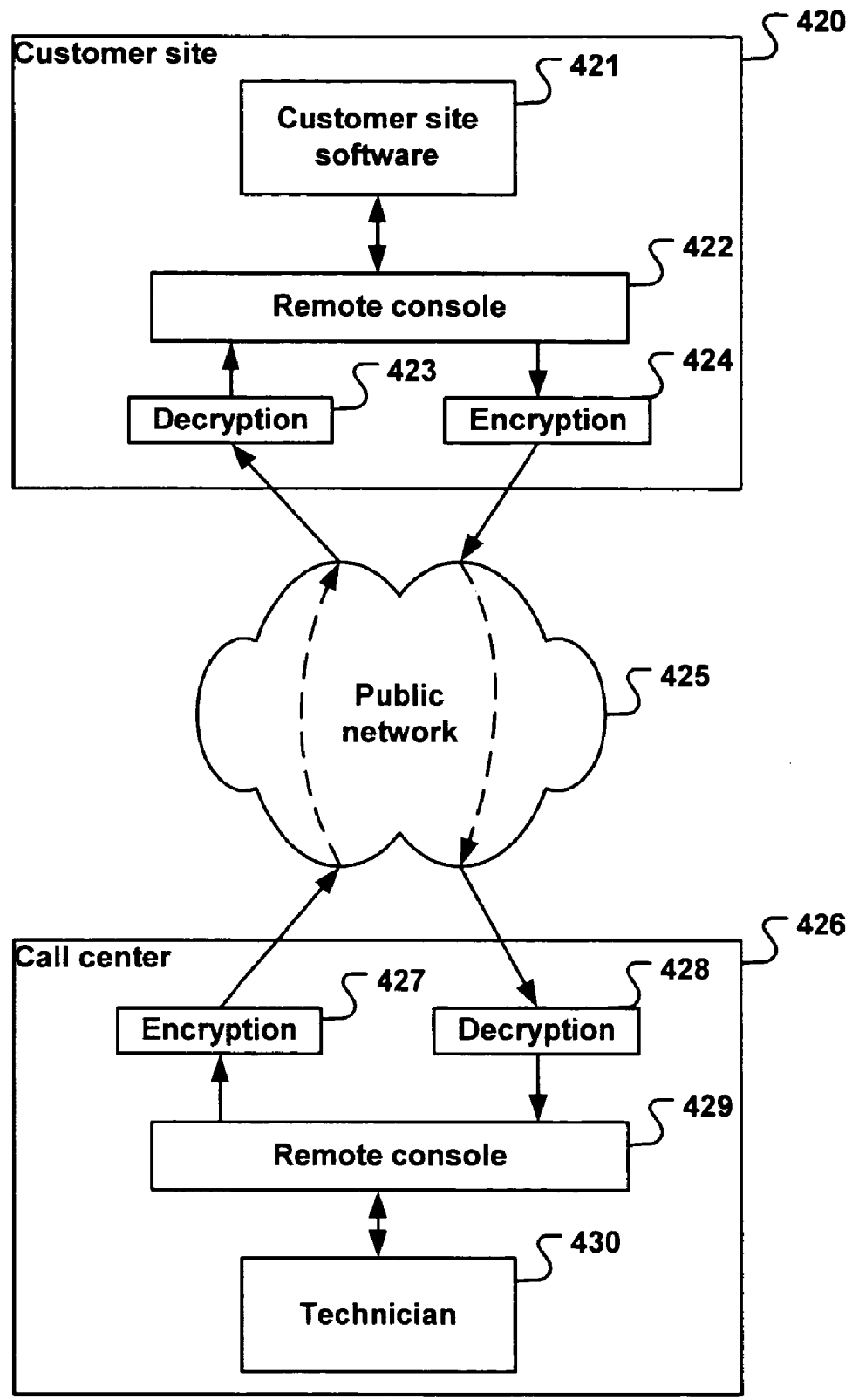
FIG. 21 is a block diagram of the remote support process.

Referring to FIG. 21, if the problem cannot be solved by a technician 430 at the call center 426, the technician can use the customer site software 421 to attempt to solve the problem remotely at the customer site 420. By using encryption 427 that works with decryption 423 in the customer site software, and decryption 428 that works with encryption 424 in the customer site software, the technician 430 can safely use a public network 425 to connect a remote console 429 to a remote console manager 422 in the customer site software. The remote console manager 422 uses the customer site software 421 to implement all the requests and commands initiated by the technician 430, using the same interface as the one implemented for network operations over multiple machines (as shown in FIG. 11). It should be noted that FIG. 21 is meant to be representative, and many other configurations for remote support could be described by one skilled in the art.

Figure 22:
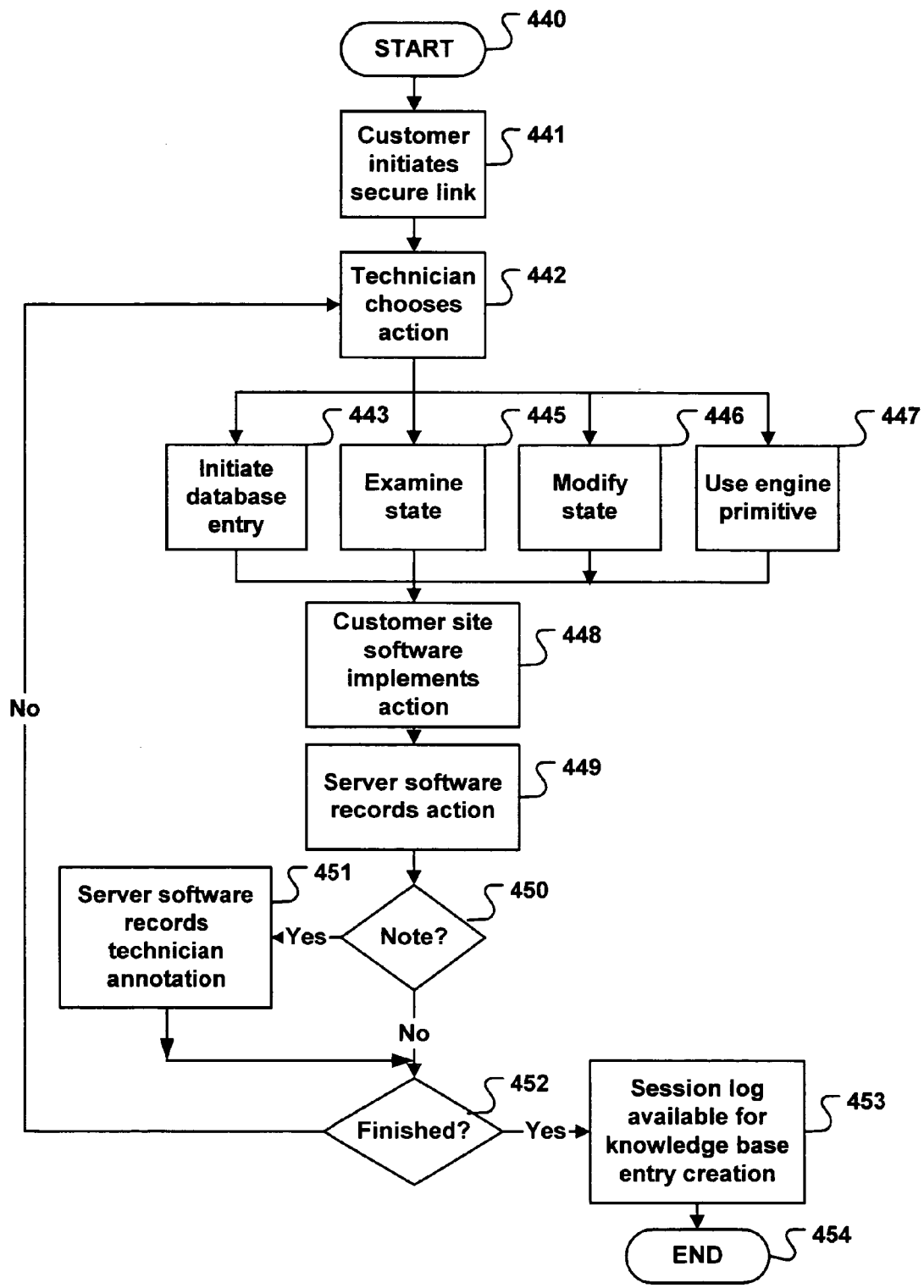
FIG. 22 is a flowchart of the remote support sequence.

FIG. 22 details the actual process by which this remote support is implemented. Step 440 starts the process. In step 441, the customer initiates the entire process by establishing a secure link between the customer site and the call center. In step 442, the technician selects an action to take. The technician can choose to initiate a database entry in step 443, which will cause the customer site software to force the selected entry to be chosen by the scheduler. The technician can choose to examine state in step 445, which will cause the customer site software to access the requested state information and return its value to the technician. The technician can choose to modify state in step 446, which will cause the customer site software to modify the requested state information as specified by the technician. The technician can choose to use an engine primitive in step 447, which will cause the customer site software to call a primitive with the parameters specified by the technician, and return the results for review by the technician. In step 448, the customer site software implements the chosen action, and in step 449 the server software records the action and its results in a log. In step 450, the technician can choose to add arbitrary descriptive information, and if this choice is made, step 451 adds this information to the log. In step 452, the technician decides whether the remote session is finished. If not, the process returns to step 442 to handle the next action. If so, the session is finished in step 453 and the entire log is available for review to create a new entry in the master knowledge base to handle this problem. The process ends at step 454. It should be noted that FIG. 22 represents the remote session implementation for one embodiment, and many other implementations of the remote session could be described by one skilled in the art.

Figure 23:
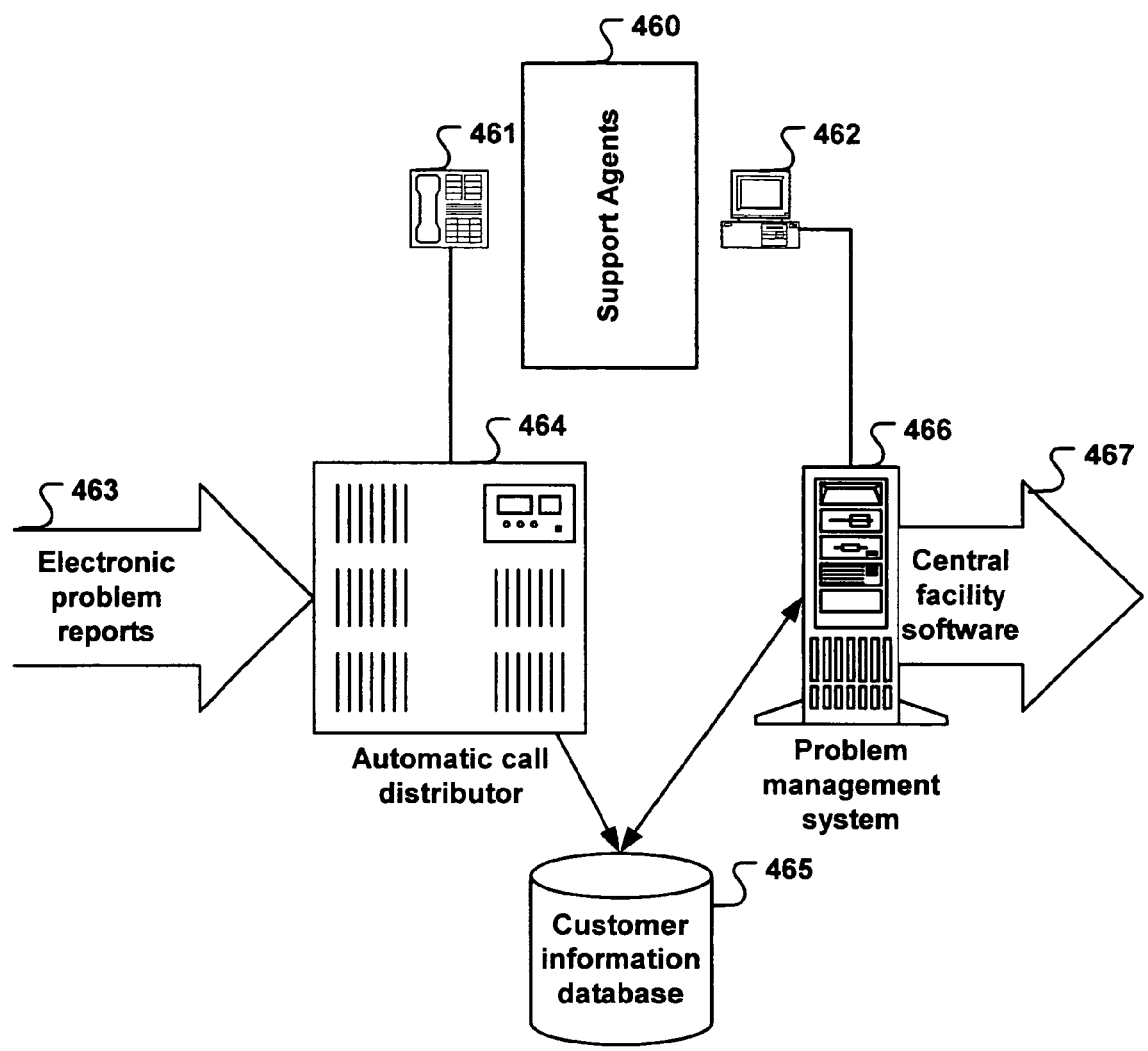
FIG. 23 is a block diagram of an existing call center and its integration with the central facility.

Referring to FIG. 23, the integration between the call center and the central facility is done in such a way that allows existing call centers to be easily integrated. The problem reports 463 continue to come into the existing call center into the automatic call distributor (ACD) 464. The customer site software uses the same format as other types of electronic problem reports handled by the ACD. The support agents 460 handle the calls in the normal fashion, using the customer information database 465, ordinary communication 461 with the customers, and the normal interface 462 to the existing problem management system (PMS) 466. The main difference is that technicians at the central facility also have access to the PMS 466, through a computer network link 467. In the central facility, the staff use the same equipment 462 as the support agents 460 do in order to access the PMS 466, so they have the same access to the customer information database 465. They utilize this information while creating and modifying entries in the master knowledge base. It should be noted that FIG. 23 is meant to be representative, and many other configurations for a call center could be described by one skilled in the art.

Figure 24:
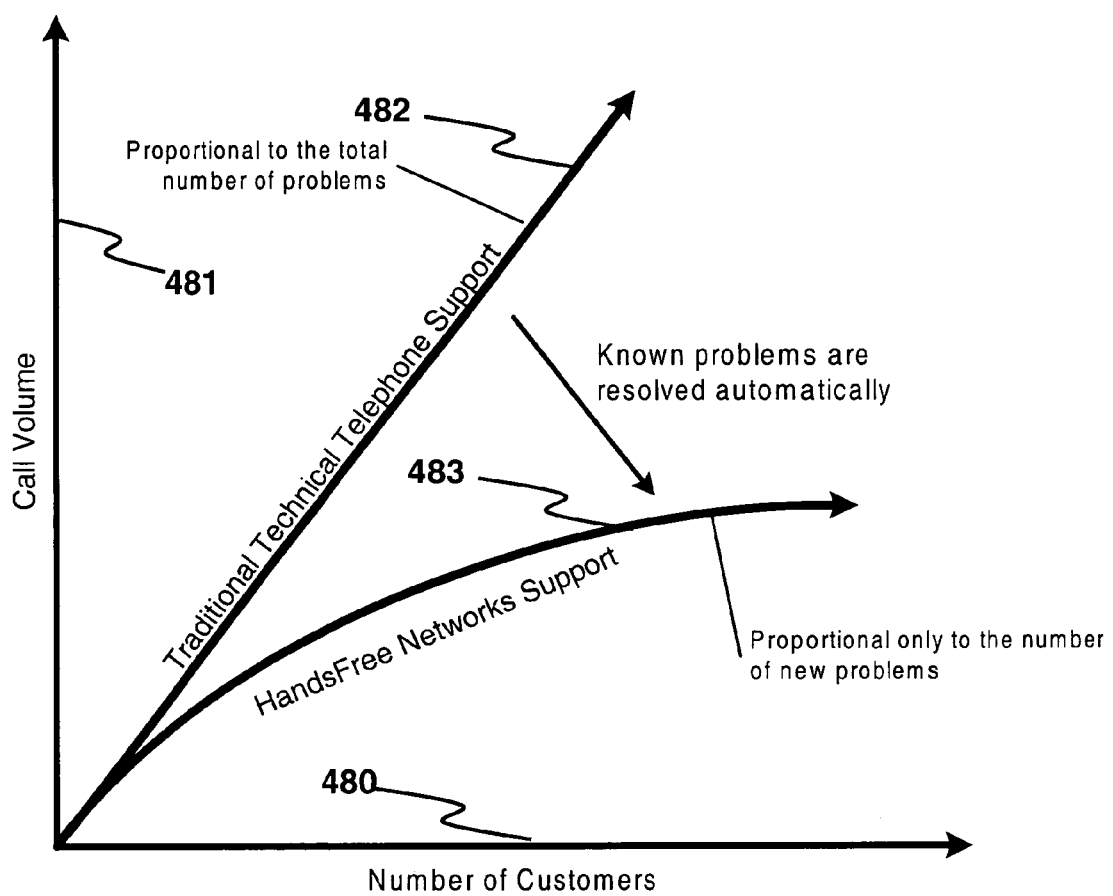
FIG. 24 is a graph of call volume vs. customer base size.

Referring to FIG. 24, the economic benefits of this implementation of automatic problem detection and resolution are clear. The graph shows the size of the customer base on the x-axis 480, and the total number of calls coming into the call center on the y-axis 481. With a traditional call center setup, the number of calls coming into the call center is linearly proportional to the number of customers using the call center, as shown by the line 482. However, with the invention described herein, any problem that is solved once by the call center will be solved automatically by the customer site software in the future, so it will not generate further calls to the call center. Therefore, the number of calls coming into the call center will be proportional to the total number of brand new unique problems encountered by the customer base, which asymptotically approaches a constant as shown by the line 483. Since the cost of a call center is directly related to the number of calls that come into the center, this means that the present invention allows a fixed size call center to support extremely large numbers of customers economically. Many variations can be made to the embodiment described above, including but not limited to, the following embodiments.

The system can be made to work without immediate access to the central facility through the Internet or other wide area network. The operations requiring this access can be delayed until the access is available. If a severe problem interferes with system operation, the state reversion mechanism can be used to effect a temporary solution.

The system can be used to diagnose and correct problems on devices other than computers, such as household appliances. The communication mechanism between the devices can be one other than a computer network, such as a low speed serial link.

The implementation of the customer site software can be done as an embedded system that is built into a device during manufacturing, or added on as a feature, rather than being software that is distributed on removable media for a general-purpose computer.

The method used for caching access to the knowledge base can be generalized to more than three levels, and can be extended to allow further redundancies to enhance performance and reliability.

A method can be implemented for automatically recording the actions of a technician in repairing a problem and adding the result to the knowledge base. This "learning" operation would mean that once anyone successfully fixed a problem, it would automatically be fixed on all systems in the future.

The call center implementation can be extended to allow for multiple physical call centers that are connected and maintain synchronization automatically. This allows for supporting extremely large number of customers using techniques such as balancing loads across time zones. It also allows a scalable solution as the customer base grows.

The system can be implemented without the entire problem escalation mechanism described. For example, the system could run entirely automatically without a call center if the automated support interaction mechanism were removed from the escalation sequence.

Those skilled in the art should readily appreciate that the programs defining the operations and methods defined herein are deliverable to the software-based system in many forms, including but not limited to a) information permanently stored on non-writeable storage media such as ROM devices, b) information alterable stored on writeable storage media such as floppy disks, magnetic tapes, CDs, RAM devices, and other magnetic and optical media, or c) information conveyed to a computer through communication media, for example using baseband signaling or broadband signaling techniques, as in an electronic networks such as the Internet or telephone modem lines. The operations and methods may be implemented in a software executable out of a memory by a processor. Alternatively, the operations and methods may be embodied in whole or in part using hardware components, such as Application Specific Integrated Circuits (ASICs), state machines, controllers or other hardware components or devices, or a combination of hardware and software components. While this invention has been particularly shown and described with references to preferred embodiments thereof, it will be understood by those skilled in the art that various changes in form and details may be made therein without departing from the scope of the invention encompassed by the appended claims. Accordingly, the present invention is not intended to be limited except by the following claims.

What is claimed is:

1. A method for resolving problems in software-based systems, comprising:
   automating resolving said problems using software;
   storing executable code in a local database having a plurality of entries to define said automated resolving;
   updating said local database from a central database having a plurality of entries, said updating being initiated automatically without user intervention;
   recording a count of said automated resolutions for each entry in said local database;
   updating said central database with said count to generate a central total count in said central database of said automated resolutions; and
   updating a local total count in said local database from said central total count in said central database as part of said periodic update.

2. The method of claim 1 wherein said local database is a relational database.

3. The method of claim 1 wherein said executable code is directly executable machine code.

4. The method of claim 1 wherein said executable code is an interpreted representation.

5. The method of claim 1 wherein said updating of said local database is initiated automatically at predetermined intervals.

6. The method of claim 1 wherein said updating of said local database is initiated automatically as a result of said automated resolving failing to succeed.

7. The method of claim 1 wherein said updating of said local database comprises the steps of:
   identifying hardware and software components that exist at a local site of said software-based system;
   creating a selection from said entries in said central database that corresponds to said hardware and software components; and
   modifying said local database to cause it to match said selection.

8. The method of claim 7, wherein said modifying further comprises:
   comparing said local database to said selection to determine differences; and
   using said differences to perform said modification.

9. The method of claim 8, wherein said comparing further comprises comparing a signature of said local database to a signature of said selection, wherein said signatures are adapted for detecting of said differences between entries.

10. The method of claim 6 further comprising, if said automated resolving step fails to succeed, retrying of said automated resolving.

11. The method of claim 10 further comprising automating transmitting of a problem report to a call center if said retrying step fails to succeed.

12. The method of claim 11 wherein said transmitting of said problem report is via a computer network.

13. The method of claim 11 wherein said transmitting of said problem report is via a pager.

14. The method of claim 11 wherein said transmitting of said problem report further includes transmitting information automatically gathered as a result of said automated resolving.

15. The method of claim 11 wherein said transmitting of said problem report further includes:
   transmitting information automatically gathered as a result of said automated resolving, with said information automatically gathered including state information indicative of the creation of an entry in said central database; and
   invoking a development tool operable to create executable code as a result of said state information, wherein said state information is provided to a programmer via said development tool for creating executable code adapted to be entered into said central database.

16. The method of claim 15, further comprising the steps of:
   manually initiating a connection to said call center; and
   using said connection from said call center to manually initiate operations for assisting in the manually diagnosing of said failure of said automated resolving.

17. The method of claim 15, further comprising the steps of:
   recording said operations; and
   providing said recording to a programmer, through a development tool operable for creating said executable code to be entered into said central database.

* * * * *